United States Patent
Gipson et al.

(10) Patent No.: US 9,688,122 B2
(45) Date of Patent: Jun. 27, 2017

(54) MOTOR VEHICLE WINDOW ASSEMBLY WITH DEFROST

(75) Inventors: Ronnie G. Gipson, Metamora, MI (US); Scott S. Sharron, LaSalle (CA); Kenneth E. Keck, II, Clinton Township, MI (US); Walter J. Steiner, Rochester, MI (US); Ramakrishna Putumbaka, Farmington Hills, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 39 days.

(21) Appl. No.: 13/476,430

(22) Filed: May 21, 2012

(65) Prior Publication Data

US 2012/0291353 A1 Nov. 22, 2012

Related U.S. Application Data

(60) Provisional application No. 61/488,511, filed on May 20, 2011, provisional application No. 61/496,014, filed on Jun. 12, 2011, provisional application No. 61/536,664, filed on Sep. 20, 2011.

(51) Int. Cl.
*B60J 1/18* (2006.01)
*B60S 1/02* (2006.01)
*H05B 3/84* (2006.01)

(52) U.S. Cl.
CPC ............ *B60J 1/1853* (2013.01); *B60S 1/026* (2013.01); *H05B 3/84* (2013.01); *H05B 2203/016* (2013.01)

(58) Field of Classification Search
CPC .... B60J 1/1853; H05B 3/84; H05B 2203/016; B60S 1/026

USPC .......... 49/380, 413, 358, 409, 209, 213, 214
See application file for complete search history.

(56) References Cited

U.S. PATENT DOCUMENTS

| | | | |
|---|---|---|---|
| 4,386,777 A * | 6/1983 | Prehodka | 104/281 |
| 5,542,214 A | 8/1996 | Buening | |
| 5,551,193 A | 9/1996 | Barnett | |
| 5,613,323 A | 3/1997 | Buening | |
| 5,613,325 A | 3/1997 | Mariel | |
| 6,014,840 A | 1/2000 | Ray et al. | |
| 6,026,611 A | 2/2000 | Ralston et al. | |
| 6,223,470 B1 | 5/2001 | Millard et al. | |

(Continued)

FOREIGN PATENT DOCUMENTS

JP 2007153157 6/2007

*Primary Examiner* — Gregory Strimbu
(74) *Attorney, Agent, or Firm* — Reising Ethington P.C.; Matthew J. Schmidt; Robert E. Ford

(57) ABSTRACT

A motor vehicle window assembly, one implementation of which includes a wiper in electrical communication between a defrost grid of a movable window and an elongate conductor of a guide rail assembly having a straight guide portion and an oblique guide portion, and in contact with the elongate conductor when the movable window is in an open position. At least one implementation of the window assembly includes an actuator cable including a core having a terminus coupled to a cable connector portion of the movable window, wherein when the actuator cable is actuated, the movable window moves in a direction extending away from the open position along a plane, toward a closed position out of the plane, and into the closed position in another plane such that the terminus of the core is carried out of the plane by the movable window.

19 Claims, 21 Drawing Sheets

(56) References Cited

U.S. PATENT DOCUMENTS

| | | |
|---|---|---|
| 6,766,617 B2 | 7/2004 | Purcell |
| 7,464,501 B2 | 12/2008 | Arimoto et al. |
| 7,568,312 B2 | 8/2009 | Dufour et al. |
| 7,641,265 B2 * | 1/2010 | Seiple et al. ............... 296/190.1 |
| 7,673,419 B2 | 3/2010 | Arimoto |
| RE41,502 E | 8/2010 | Neaux |
| 7,765,738 B2 | 8/2010 | Dufour et al. |
| 8,402,695 B2 * | 3/2013 | Smith et al. ................... 49/380 |
| 8,578,654 B2 * | 11/2013 | Rao et al. ...................... 49/413 |
| 2008/0122262 A1 | 5/2008 | Cicala |
| 2009/0107052 A1 | 4/2009 | Dufour et al. |
| 2010/0146859 A1 | 6/2010 | Gipson et al. |
| 2010/0154312 A1 | 6/2010 | Gipson et al. |
| 2011/0030276 A1 | 2/2011 | Smith et al. |
| 2012/0091113 A1 * | 4/2012 | Bennett et al. ............... 219/203 |
| 2012/0091114 A1 * | 4/2012 | Ackerman et al. ........... 219/203 |
| 2012/0117880 A1 * | 5/2012 | Lahnala et al. .................. 49/70 |
| 2013/0019532 A1 * | 1/2013 | Ash et al. ......................... 49/70 |

* cited by examiner

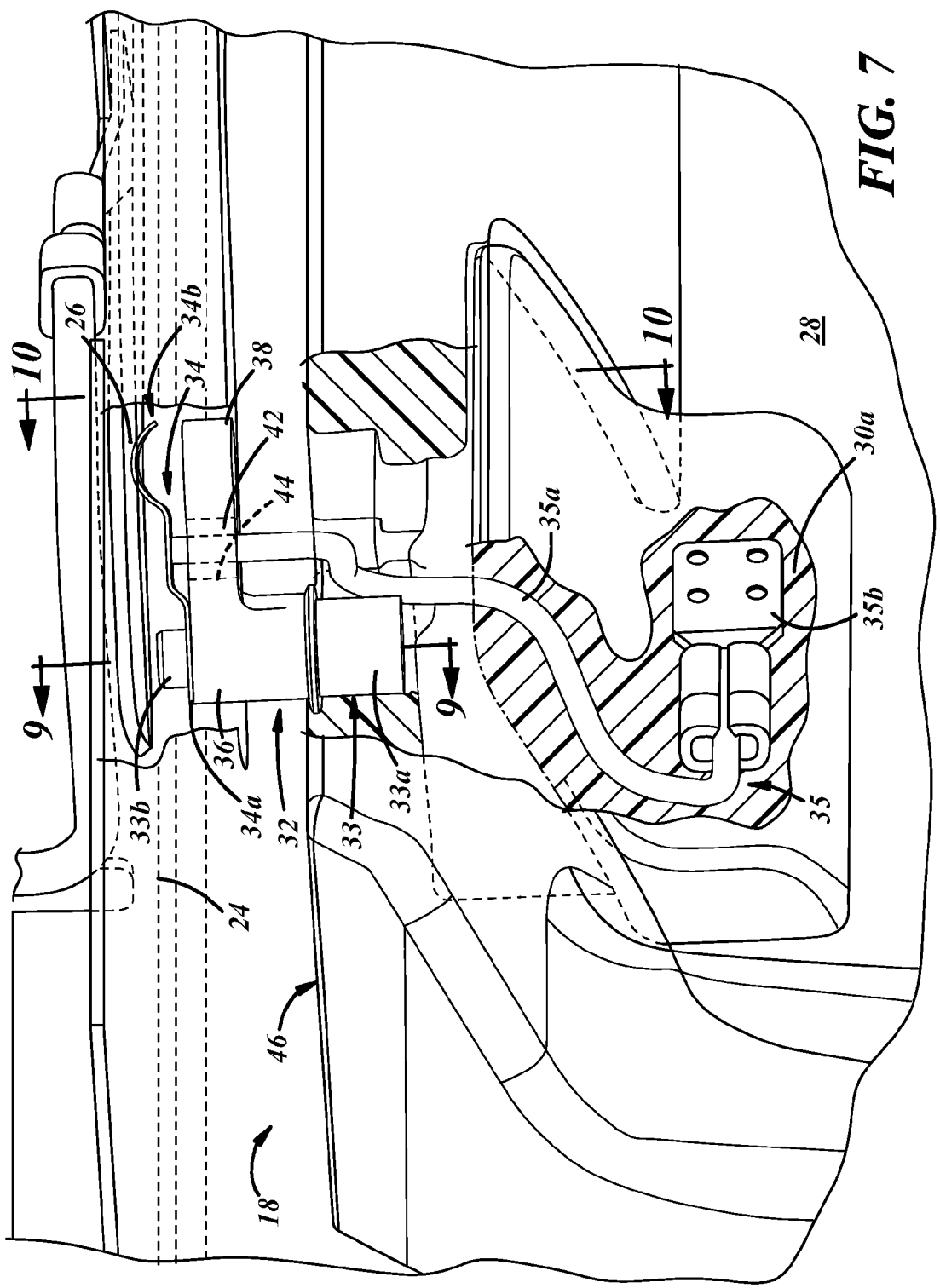

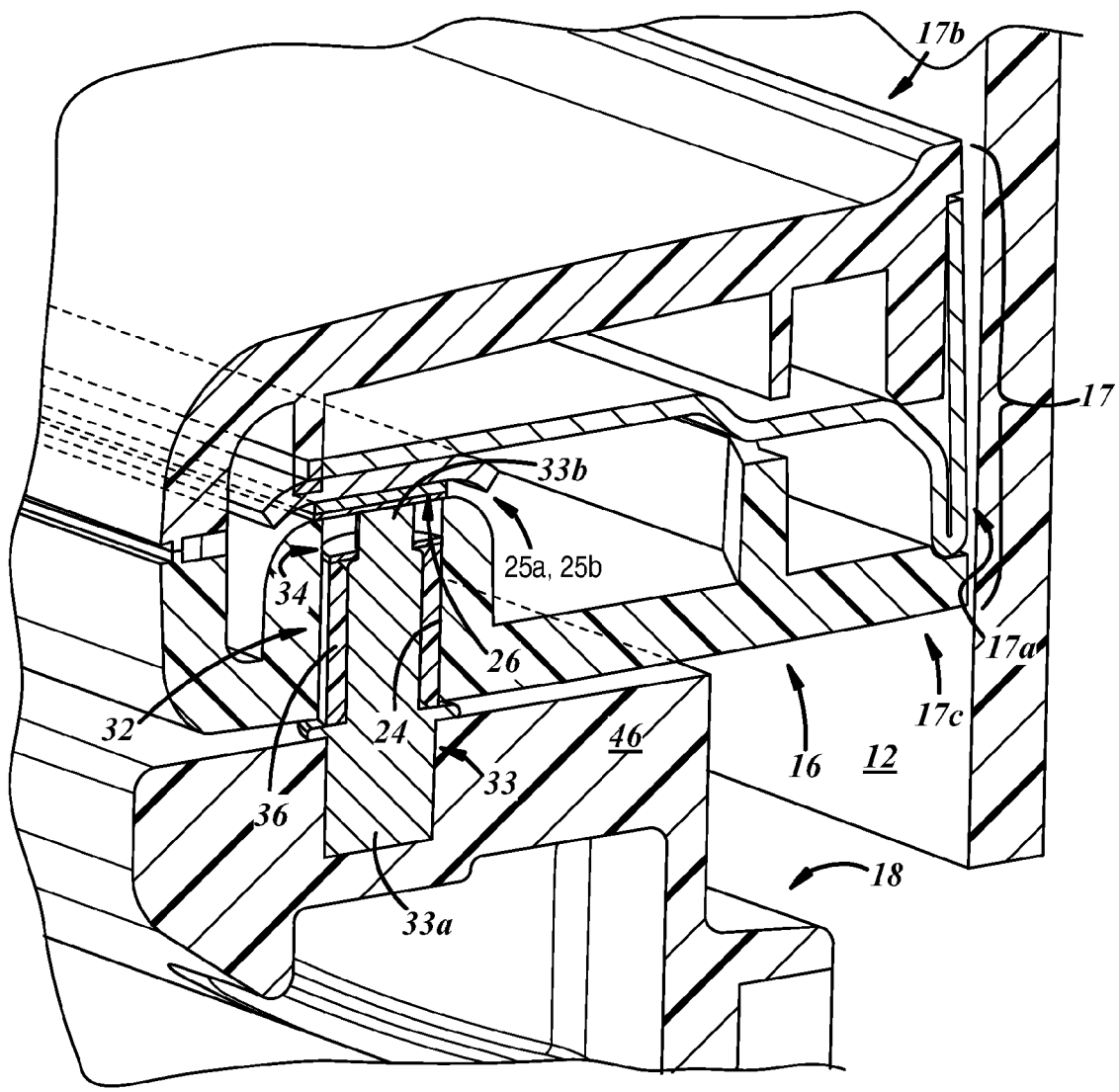
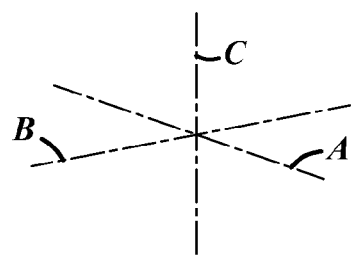
FIG. 9

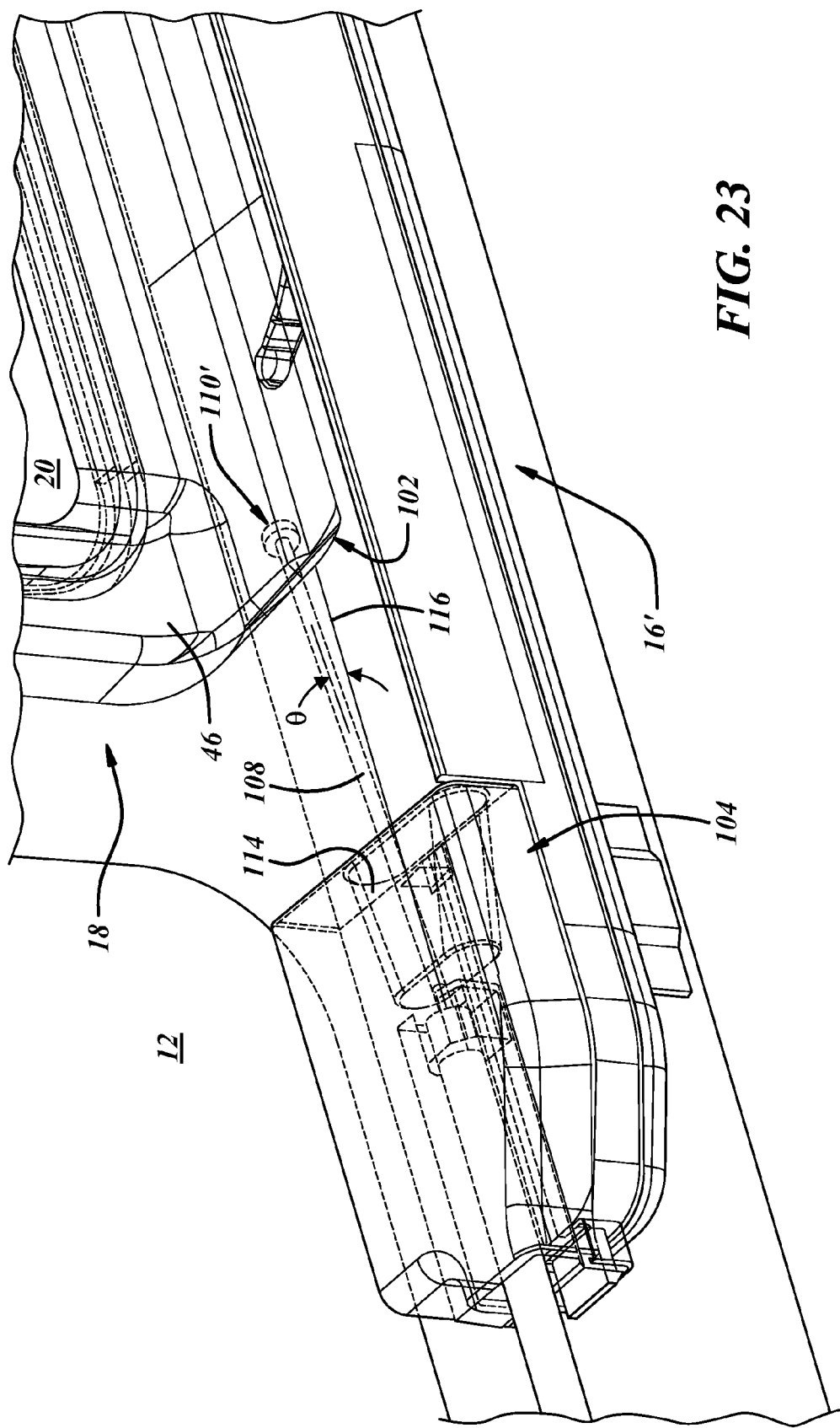

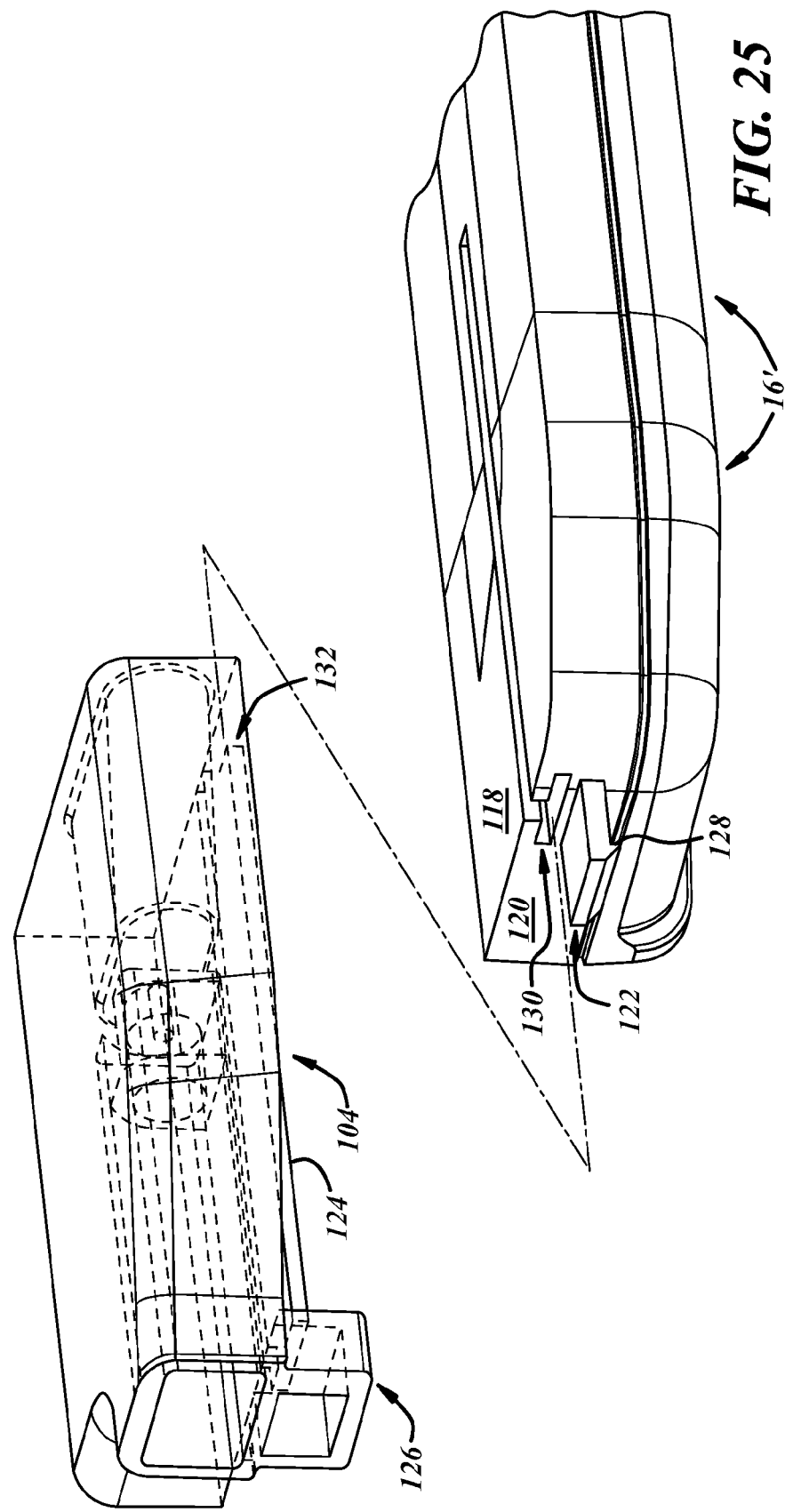

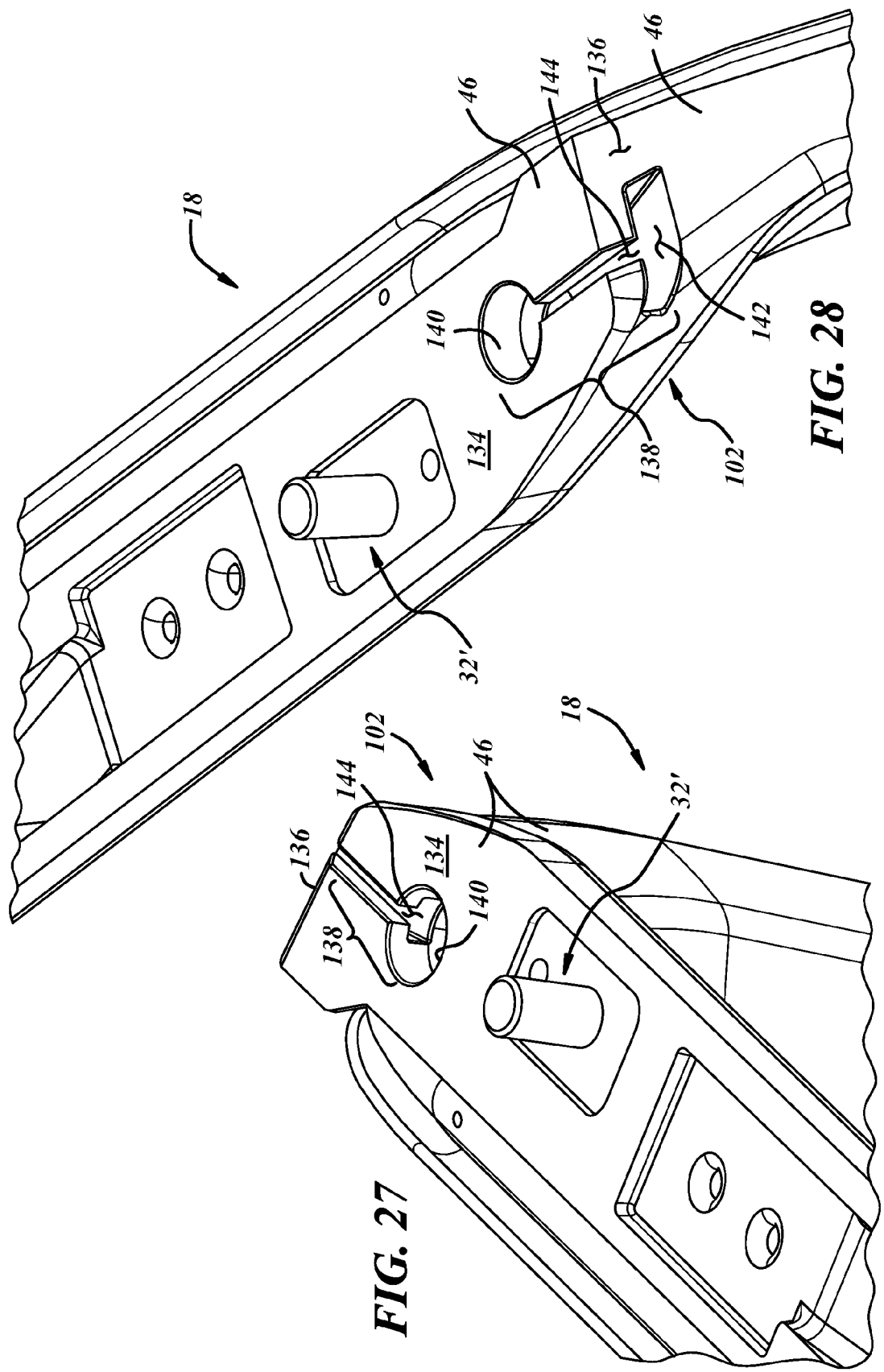

MOTOR VEHICLE WINDOW ASSEMBLY WITH DEFROST

REFERENCE TO COPENDING APPLICATIONS

This application claims the benefit of U.S. Provisional Patent Application Ser. Nos. 61/488,511 filed May 20, 2011, 61/496,014 filed Jun. 12, 2011, and 61/536,664 filed Sep. 20, 2011, which are incorporated herein by reference in their entireties.

TECHNICAL FIELD

The present disclosure relates to a window assembly for a motor vehicle.

BACKGROUND

Vehicle window assemblies come in many different forms.

Examples of vehicle window assemblies are described in the following U.S. Patents and Patent Application Publications: U.S. Pat. Nos. 5,551,193; 5,542,214; 5,613,323; 5,613,325; 6,014,840; 6,026,611; 6,223,470; 6,766,617; 7,568,312; 7,765,738; 2008/0122262; 2009/0107052; 2010/0146859; and 2010/0154312.

SUMMARY OF THE DISCLOSURE

In a first implementation a motor vehicle window assembly may include a fixed pane having a first defrost grid, and a guide rail assembly including an elongate guide having a straight guide portion and an oblique guide portion and an elongate conductor in electrical communication with the first defrost grid and having a straight conductor portion and an oblique conductor portion. Also, a movable window assembly is carried by the guide rail assembly to move along an elongate path of travel between a closed position and an open position. The movable window assembly may include a pane having a second defrost grid, and a wiper in electrical communication between the second defrost grid and the elongate conductor of the guide rail assembly. The wiper is in contact with the elongate conductor when the movable window assembly is in the open and closed positions, and the wiper is in contact with the elongate conductor along at least a portion of the elongate conductor when the movable window assembly travels along the elongate path.

A motor vehicle window assembly may include a fixed pane having a first defrost grid, a fixed conductor in electrical communication with the first defrost grid, and a guide rail, wherein the conductor and the guide rail have straight portions and oblique portions. The assembly also may include a movable pane guided by the guide rail for movement between a closed position in a first plane and an open position in a second plane offset from the first plane, and a second defrost grid carried by the movable pane. The assembly further may include a movable conductor electrically communicated between the second defrost grid and the fixed conductor and movable with the movable pane and relative to the fixed conductor when the movable pane is moved between its open and closed positions, and the movable conductor is in contact with and wipes across at least a portion of the fixed conductor during at least a portion of the movement of the movable pane between its open and closed positions.

Further, a motor vehicle window assembly may include a fixed pane having a surface, and a guide rail assembly extending in a direction away from the surface of the fixed pane and including an elongate guide having a straight portion and an oblique portion. Also, a movable window assembly is carried by the guide rail assembly to move along an elongate path of travel between a closed position in a first plane and an open position in a second plane offset from the first plane and spaced apart from the surface of the fixed pane. The movable window assembly may include a pane, and a cable connector portion coupled to the pane. The motor vehicle window assembly further may include an actuator cable including a core having a terminus coupled to the cable connector portion of the movable window assembly, and a sheath covering at least a portion of the core. When the actuator cable is actuated, the movable window assembly moves in a direction extending away from the open position along the second plane, toward the closed position out of the second plane, and into the closed position in the first plane such that the terminus of the core is carried out of the second plane by the movable window assembly.

A motor vehicle window assembly may include a fixed pane having a surface and a first defrost grid, and a guide rail assembly extending in a direction away from the surface of the fixed pane and including an elongate guide having a straight guide portion and an oblique guide portion and an elongate conductor in electrical communication with the first defrost grid and having a straight conductor portion and an oblique conductor portion. Also, a movable window assembly is carried by the guide rail assembly to move along an elongate path of travel between a closed position in a first plane and an open position in a second plane offset from the first plane and spaced apart from the surface of the fixed pane. The movable window assembly may include a pane having a second defrost grid, a cable connector portion coupled to the pane, and a wiper in electrical communication between the second defrost grid and the elongate conductor of the guide rail assembly. The wiper is in contact with the elongate conductor when the movable window assembly is in the open and closed positions, and the wiper is in contact with the elongate conductor along at least a portion of the elongate conductor when the movable window assembly travels along the elongate path. The motor vehicle window assembly further may include an actuator cable including a core having a terminus coupled to the cable connector portion of the movable window assembly, and a sheath covering at least a portion of the core. When the actuator cable is actuated, the movable window assembly moves in a direction extending away from the open position along the second plane, toward the closed position out of the second plane, and into the closed position in the first plane such that the terminus of the core is carried out of the second plane by the movable window assembly.

Other implementations can be derived from combinations of the above and those from the implementations shown in the drawings and the descriptions that follow.

BRIEF DESCRIPTION OF THE DRAWINGS

The following detailed description of preferred implementations and best mode will be set forth with regard to the accompanying drawings, in which:

FIG. 7 is a further enlarged, fragmentary perspective view of the mounting and conductor arrangement of FIG. 5;

FIG. 9 is a sectional view taken along line 9-9 of FIG. 7, illustrating a hub of a follower in the elongate guide;

FIG. 23 is an enlarged perspective view of the portion of the window assembly of FIG. 22, illustrating the movable window assembly moved out of the plane toward the closed position;

FIG. 25 is an enlarged perspective view of a portion of the window assembly of FIG. 1, illustrating a portion of the guide rail assembly and a cable mount;

FIG. 27 is an enlarged, fragmentary perspective view of a portion of the window assembly of FIG. 1, illustrating a portion of the movable window assembly to accept an actuator cable core terminus; and FIG. 28 is a perspective view of the portion of the window of FIG. 27, taken from a different angle.

DETAILED DESCRIPTION OF PREFERRED IMPLEMENTATIONS

In general, this description includes various example implementations of a motor vehicle window assembly. In a first implementation, electricity can be communicated to a defrost grid of a pane of a movable window assembly when the movable window assembly is in open and closed positions and when travelling along a path between the open and closed positions. In a second implementation, a movable window assembly moves in a direction extending away from an open position along a second plane, toward a closed position out of the second plane, and into the closed position in a first plane such that a terminus of a core of an actuator cable is carried out of the second plane by the movable window assembly. In a third implementation, the first and second implementations are combined.

The example implementations will be described with reference to use in a frameless, one-piece fixed pane type of backlight of a pickup truck. However, it will be appreciated as the description proceeds that the claimed invention is useful in many different applications and may be implemented in many other implementations. For example, the claimed invention may be used in a backlight having a frame carrying a plurality of the fixed panes. In another example, the claimed invention may be used in a side vent of a minivan or car, or in any other location of any other type of motor vehicle.

Figure 1:
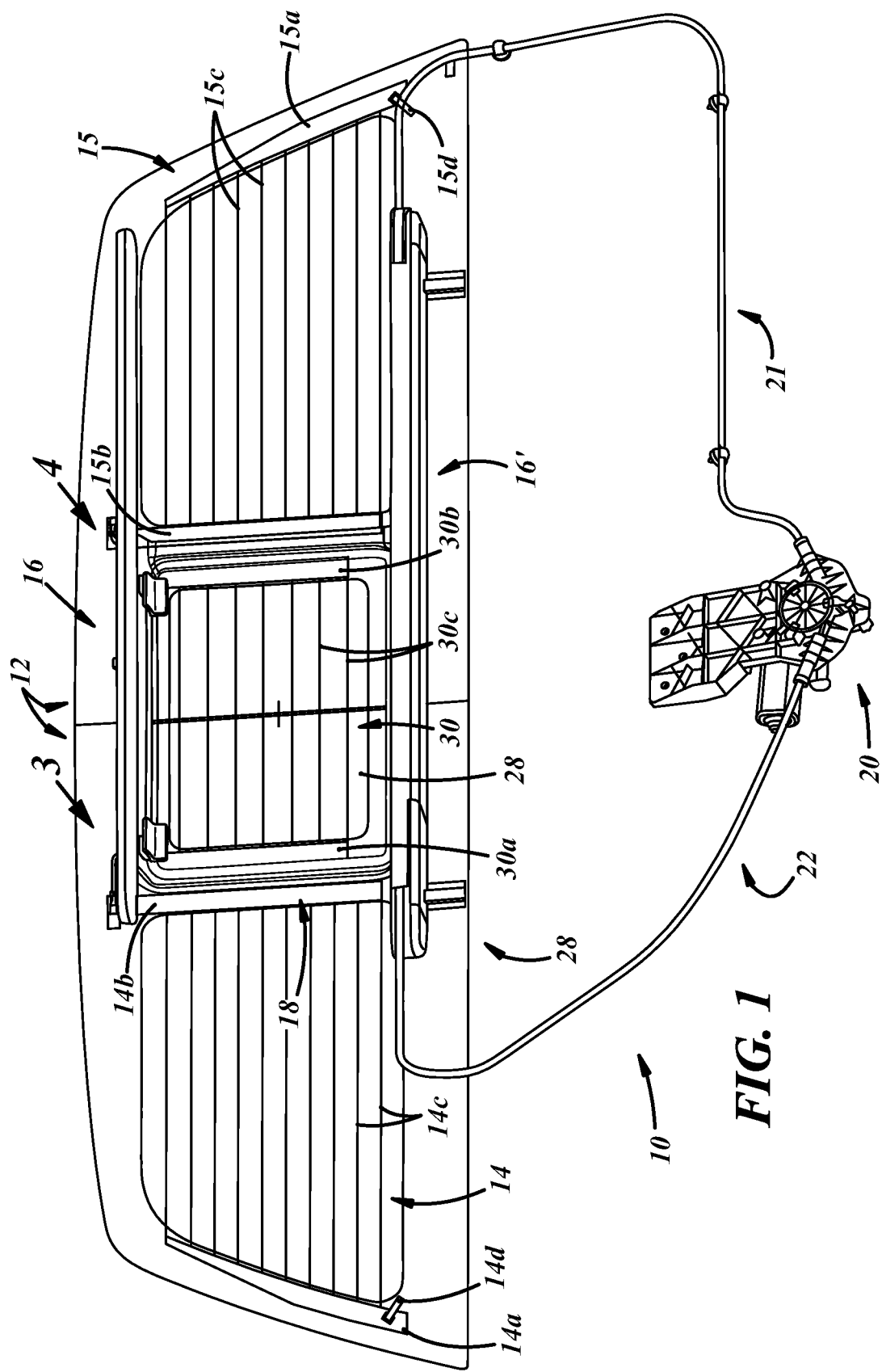
FIG. 1 is an overview of one implementation of a motor vehicle window assembly having a movable window assembly in a closed position.
Figure 2:
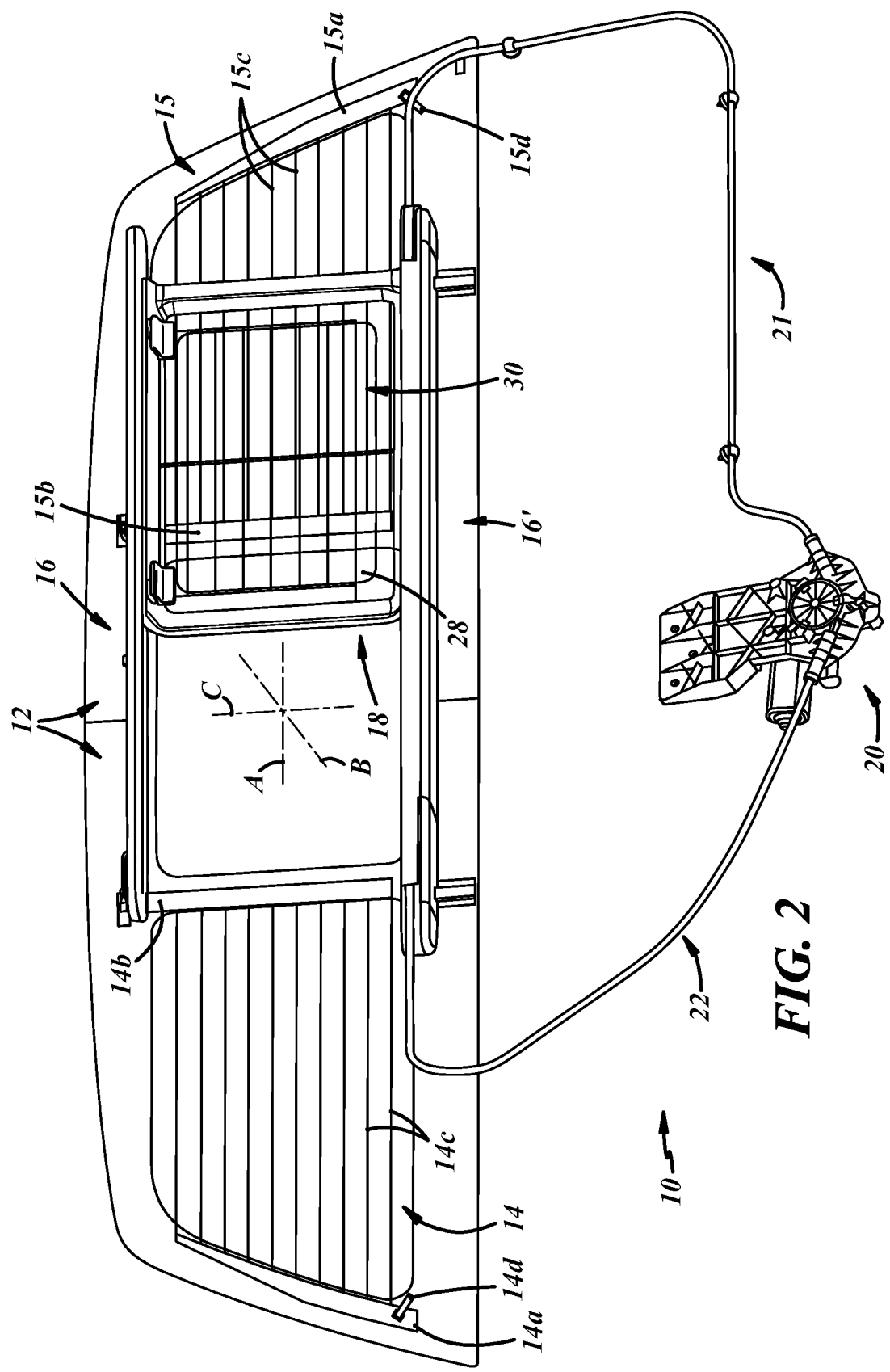
FIG. 2 is the window assembly of FIG. 1 including the movable window assembly in an open position.

Referring in more detail to the drawings, FIGS. 1 and 2 illustrate a motor vehicle window assembly 10 including one or more fixed pane 12 having one or more defrost grids 14, 15, a guide rail assembly 16, and a movable window assembly 18 carried by the guide rail assembly 16 along a path of travel between a closed position (for example, represented by FIG. 1) and an open position (for example, represented by FIG. 2). The path of travel may be elongate. As used herein, the term "elongate" includes something that has a length greater than its width. The guide rail assembly 16 may be an upper guide rail assembly, and the window assembly 10 also may include another, lower, guide rail assembly 16' that also may be used to carry and/or guide the movable window assembly 18.

The movable window assembly 18 may be moved in any suitable manner by any suitable means. For example, the window assembly 10 also may include an actuator 20 and one or more actuator cables 21, 22 coupled to the actuator 20 and to the movable window assembly 18 to open and close the movable window assembly 18. In one implementation, as illustrated in FIGS. 1 and 2, the actuator 20 may be electrically powered and may include, for example, an electric motor and a cable-drum window regulator including the cables 21, 22. In another implementation, the actuator 20 may be manually activated and may include, for example, a Bowden wire type of actuating device (not shown) coupled to the cables 21, 22. In another implementation, the actuator 20 and cables 21, 22 may be or may include any other suitable actuating device(s) to actuate movement of the movable window assembly 18.

As shown in FIG. 2, the movable window assembly 18 may move along the elongate path in a direction generally parallel to a sliding or first axis A, and also may move in a direction transverse with respect to the first axis A that may have a component of direction along a normal or second axis B. The movable window assembly 18 may be constrained against travel in a transverse or third axis C by the guide rail assembly 16.

Figure 6:
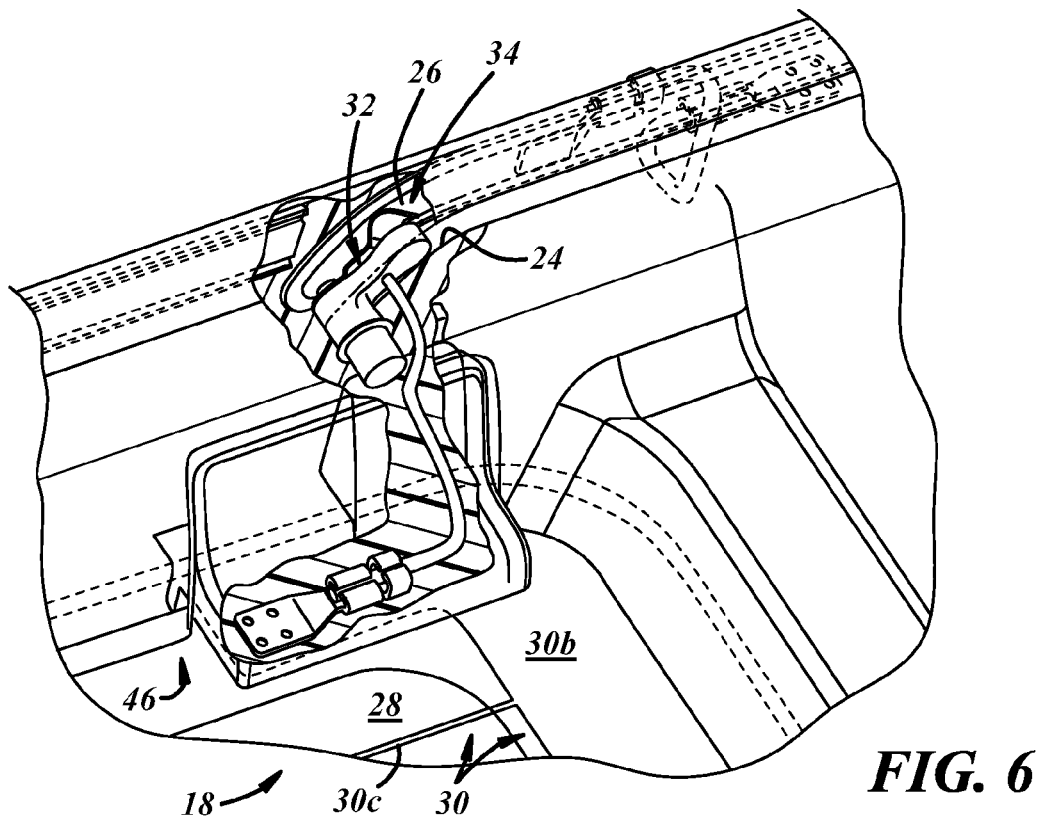
FIG. 6 is an enlarged, fragmentary perspective view of a portion of the window assembly of FIG. 1, illustrating an example implementation of another mounting and conductor arrangement between the guide rail assembly and the movable window assembly.
Figure 5:
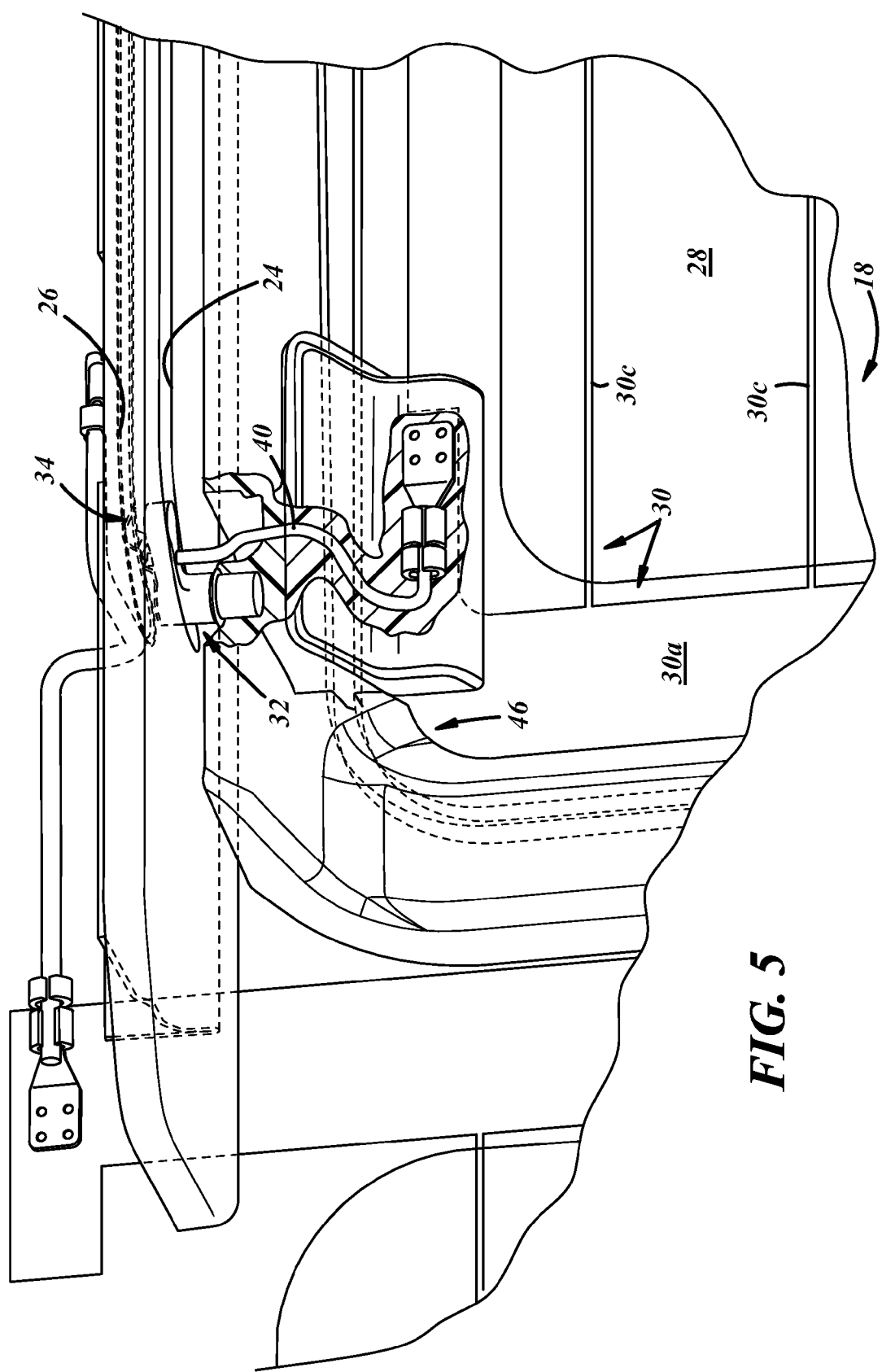
FIG. 5 is an enlarged, fragmentary perspective view of a portion of the window assembly of FIG. 1, illustrating an example implementation of a mounting and conductor arrangement between the guide rail assembly and the movable window assembly.

The movable window assembly 18 also include a pane 28 having a second defrost grid 30. The pane 28 may be composed of glass, plastic, or any other suitable material. The second defrost grid 30 may include a first bus 30*a* at one side of the pane 28 as shown in FIG. 5, a second bus 30*b* at another side of the pane 28 as shown in FIG. 6, and one or more heater elements 30*c* extending between the buses 30*a*, 30*b*.

As used herein, the terminology "defrost grid" includes any suitable device to defrost a window pane. In the illustrated implementation, the defrost grids 14, 15 may include terminal buses 14*a*, 15*a*, intermediate buses 14*b*, 15*b*, and defrost elements 14*c*, 15*c* extending between the buses 14*a*, 14*b*, 15*a*, 15*b*. Suitable connectors or terminals 14*d*, 15*d* may be brazed, adhered, or coupled in any other suitable manner to the terminal buses 14*a*, 15*a*. The terminal 14*d* may be a positive terminal coupled in any suitable manner to a positive feed of any suitable vehicle power source and the terminal 15*d* may be a negative terminal coupled in any suitable manner to a negative feed of the vehicle power source, or vice-versa. Accordingly, the defrost grids 14, 15 and 30 may be arranged in series as exemplified by the drawing figures. Those of ordinary skill in the art will also recognize that the defrost grids 14, 15 and 30 could be arranged in parallel via use of jumper wires, or the like.

Figure 11:
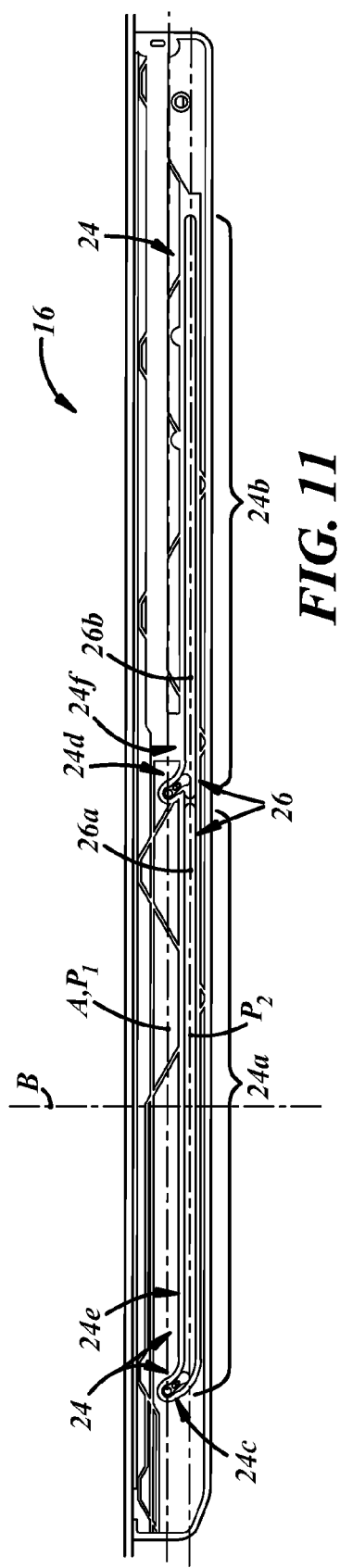
FIG. 11 is a top view of a portion of the window assembly of FIG. 1, illustrating a portion of the guide rail assembly including the elongate guides and followers in the guides when the movable window assembly is in the closed position.

Referring to FIG. 11, the guide rail assembly 16 includes one or more guides 24 and one or more conductors 26. The guides 24 and conductors 26 may be elongate. As used herein, the term "guide" includes something that steadies or directs the motion of something else. Also, as used herein, the term "conductor" includes something that conducts electricity. The elongate guide 24 may have a shape that establishes the elongate path of travel for the movable window assembly 18, and the elongate conductor may have a shape that corresponds to the shape of the guide 24. The guide 24 may include two guide portions 24*a*, 24*b* for two corresponding portions of the movable window assembly as will be discussed in detail below. Likewise, the elongate conductors 26 may include first and second conductors 26*a*, 26*b* that may correspond, respectively to first and second guide portions 24*a*, 24*b*. The conductors 26 may be separate and spaced apart in a direction generally parallel to the first axis A. The conductors 26 may be identical or different.

Also, the guide 24 may include non-straight or oblique portions 24*c*, 24*d* to establish non-linear paths, and straight portions 24*e*, 24*f* to establish linear paths extending from or in communication with the non-linear paths. The portions 24*c*, 24*d*, 24*e*, 24*f* may be used to guide the movable window assembly 18 between its closed and open positions. In particular, the oblique portions 24*c*, 24*d* may be used to guide the movable window assembly 18 out of a first plane P1 that may be parallel to the first axis A and into a second plane P2 that may be parallel to the first axis A. The oblique portions 24*c*, 24*d* may be obliquely disposed with respect to the straight portions 24*e*, 24*f* and may be angled and/or curved. Also, the straight portions 24*e*, 24*f* may guide the movable window assembly 18 along the second plane P2 toward and away from the open position of the movable window assembly 18.

Referring to FIG. 9, and in one implementation, the guide rail assembly 16 may extend in a direction away from the fixed pane 12, wherein the direction is transverse to the third axis C and may be parallel to the second axis B. In another implementation, the guide rail assembly 16 may be a portion of a window assembly frame that may carry a plurality of the fixed panes (not shown). The guide rail assembly 16 also may include a guide rail 17 of any suitable type and construction. In one implementation, the guide rail 17 may be a single piece rail (not shown).

In another implementation, exemplified in FIG. 9, the guide rail 17 may be a multiple piece rail, for instance, including a reinforcement rail 17*a*, and an outer rail carried by the reinforcement rail 17*a* that may include a first rail 17*b* and an elongate base or second rail 17*c* coupled to the first rail 17*b*. In the illustrated implementation, the reinforcement rail 17*a* may be coupled to the fixed pane 12 by adhesive, fasteners, integral interengagement, and/or in any other suitable manner. The reinforcement rail 17*a* may be composed of metal or any other suitable material. Also, the first and second rails 17*b*, 17*c* may be separate components that may be coupled together around the reinforcement rail 17*a* by adhesive, fasteners, integral interengagement, and/or in any other suitable manner. In another implementation, the rails 17*b*, 17*c* may be portions of a unitary outer rail. The rails 17*b*, 17*c* may be composed of plastic or any other suitable material.

The elongate guide 24 may be carried by the guide rail 17. For example, the elongate guide 24 may be carried by the second rail 17*c* as exemplified in FIG. 9. Also as exemplified in FIG. 9, the elongate guide 24 may include a channel or track open to the elongate conductors 26. The guide 24 may be open-ended in a direction generally parallel to the third axis C and at opposite ends: adjacent to the movable window assembly 18 at one end, and adjacent to the reinforcement rail 17*a* at another end.

The elongate conductors 26 may be carried by the guide rail 17. For example, the elongate conductors 26 may be carried between a portion of the reinforcement rail 17a and a portion of the second rail 17c, as illustrated in FIG. 9. More particularly, the conductors 26 may be preassembled to or carried by separate elongate conductor supports 25a, 25b that may be carried by the base or second rails 17c. The supports 25a, 25b also may electrically insulate the conductors 26 from the reinforcement 17a. Also, the conductors 26 may be disposed adjacent to the elongate guide 24 and may follow the same path as the elongate guide 24, as exemplified in the drawing figures.

Figure 3:
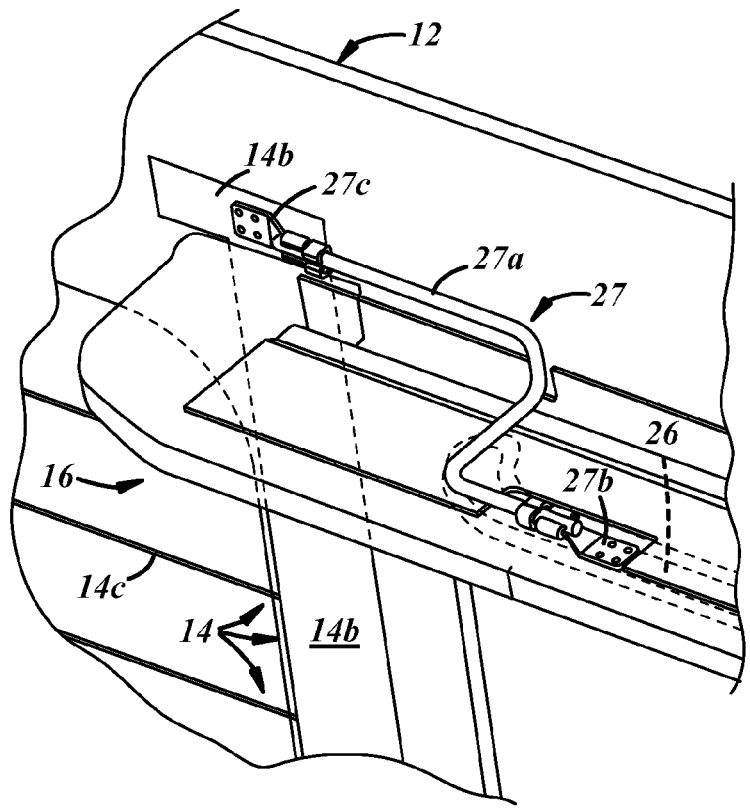
FIG. 3 is an enlarged, fragmentary perspective view of a portion of the window assembly of FIG. 2, illustrating a portion of an example implementation of a guide rail assembly including an elongate guide and a first elongate conductor extending along the elongate guide.
Figure 4:
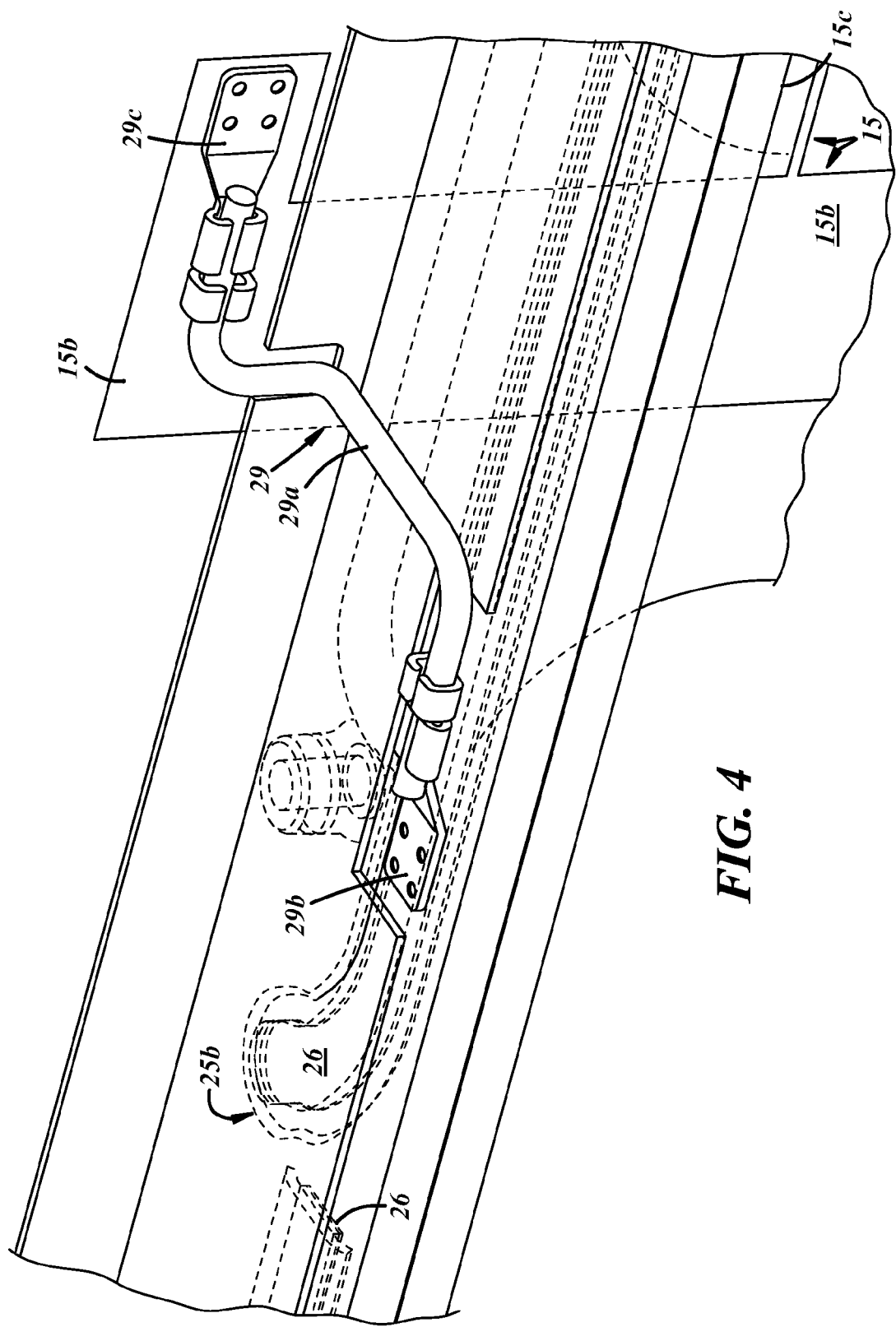
FIG. 4 is an enlarged, fragmentary perspective view of another portion of the window assembly of FIG. 1, illustrating another portion of the guide rail assembly of FIG. 3 including the elongate guide and a second elongate conductor extending along the elongate guide.

Referring to FIGS. 3 and 4, the elongate conductors 26 may be in electrical communication with the first defrost grid 14 (FIG. 3) and a third defrost grid 15 (FIG. 4). For example, electrical couplings or conductors 27, 29 may include wires 27a, 29a connected at one end to their respective conductors 26 with wire brackets 27b, 29b and connected at other ends to respective buses 14b, 15b of the grids 14, 15 via other wire brackets 27c, 29c. The brackets 27b, 27c, 29b, 29c may be welded, brazed, adhered, fastened, clipped, or coupled in any other suitable manner to the respective conductors 26 and buses 14b, 15b.

Referring to FIGS. 5 and 6, the movable window assembly 18 also may include a structural support 46. The structural support 46 may be a frame that may completely surround the pane 28 as exemplified in the drawing figures, or may be a frame portion that may bound one or more portions of the pane 28, or may be a support of any other suitable type.

Referring to FIGS. 5 through 9, the movable window assembly 18 may include one or more mounts or followers 32 coupled between the pane 28 and the elongate guides 24 of the guide rail assembly 16 to facilitate movement of the movable window assembly 18 along its elongate path of travel. In other words, the guides 24 and the followers 32 cooperate to guide the pane 28 along its elongate path of travel between its closed position in the first plane P1 (FIG. 11) and its open position in the second plane P2 (FIG. 11) offset from the first plane P1. As used herein, the term "follower" includes something that follows a guide for steadied or directed motion of something else. Those of ordinary skill in the art will recognize that the movable window assembly 18 also may include additional followers (not shown) in suitable locations for cooperating with additional elongate guides (not shown) of the other guide rail assembly 16' (FIGS. 1 and 2).

Figure 8:
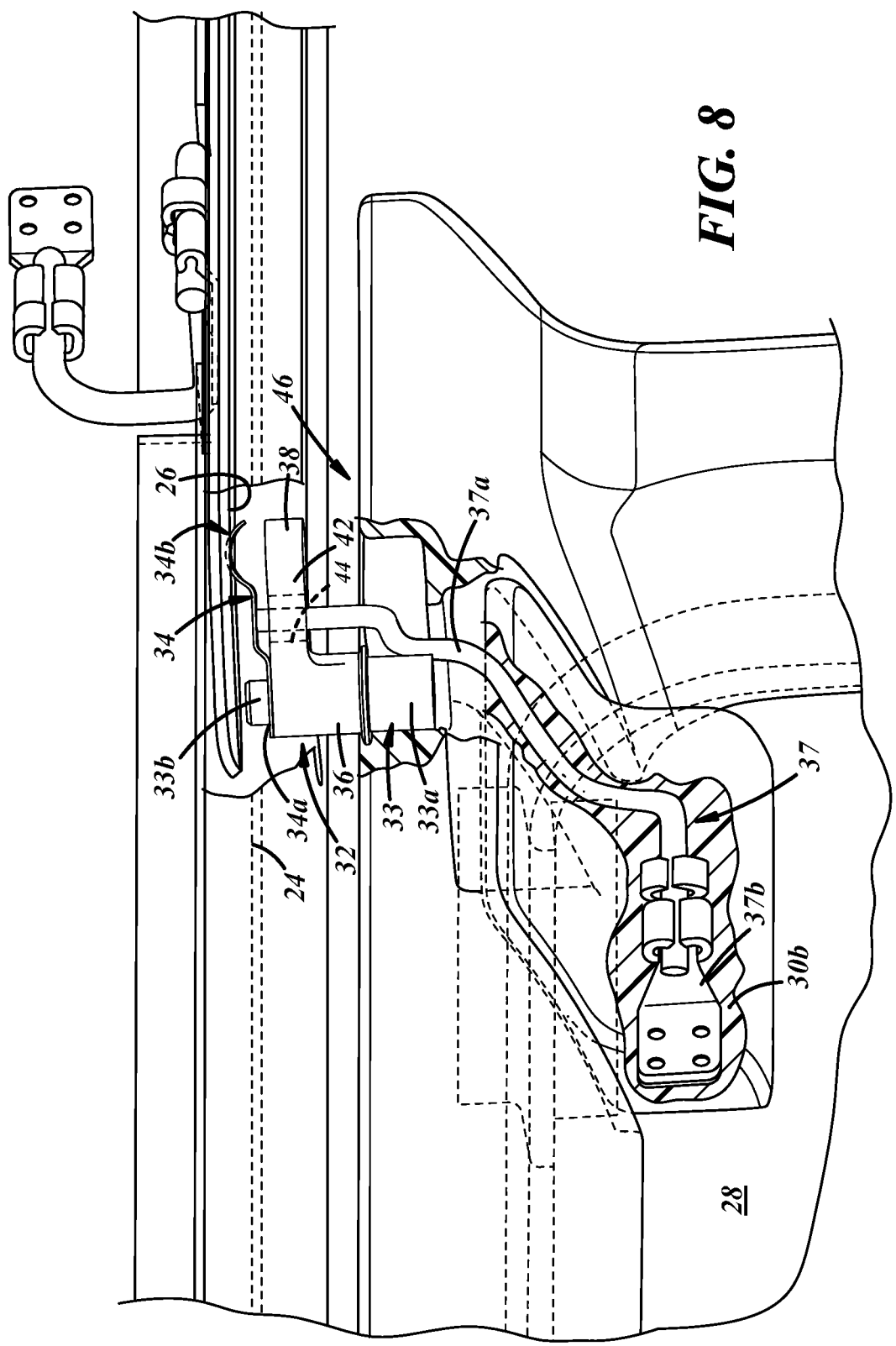
FIG. 8 is a further enlarged, fragmentary perspective view of the mounting and conductor arrangement of FIG. 6.
Figure 10:
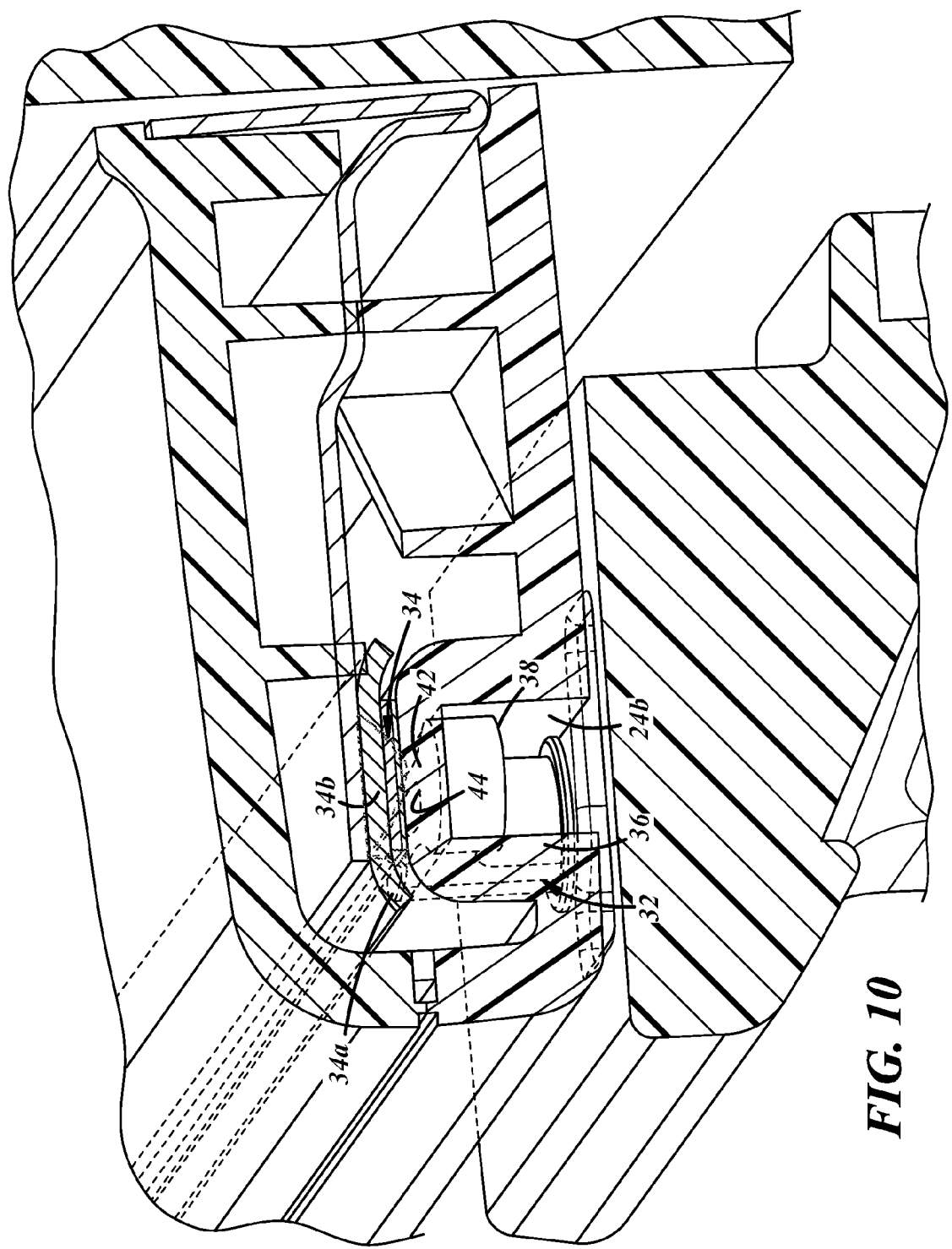
FIG. 10 is a sectional view taken along line 10-10 of FIG. 7, illustrating a cam of the follower in the elongate guide.

As exemplified in FIGS. 7-9, the followers 32 may be carried by the structural support 46. For example, the followers 32 may include posts 33 that may have fixed ends 33a that may be coupled to the structural support 46 by press fit, fastening, adhering, welding, or in any other suitable manner. Also, the followers 32 may include hubs 36 carried by the posts 33 in any suitable rotatable or pivotable manner, cams 38 spaced from the hubs 36 in a direction extending along the elongate guides 24, and intermediate portions 42 that connect the cams 38 to the hubs 36 and that may include apertures 44 therethrough.

Referring generally to FIGS. 5 through 10, the movable window assembly 18 also includes one or more conductors 34 that may be coupled to the followers 32. The conductors 34 may be or may include wipers. As used herein, the term "wiper" includes a conductor that wipes across another conductor with sliding, rolling, or otherwise relative motion therebetween. In one implementation, the conductors 34 may include cantilevered wipers having fixed ends 34a and free ends 34b. The fixed ends 34a may be coupled to the follower posts 33, for example, at free ends or extensions 33b thereof The fixed ends 34a of the conductors 34 may be press fit, fastened, adhered, welded, brazed, or coupled in any other suitable manner to the followers 32. The conductors 34 may extend over the intermediate portions of the followers 32 and may be biased into contact with the elongate conductors 26. For example, the free ends 34b of the conductors 34 may be cantilevered from the fixed ends 34a away from the movable window assembly 18 and toward the conductors 26, and may be curved for good surface contact with the conductors 26.

Referring to FIGS. 5 and 6, the conductors 34 are in electrical communication between the second defrost grid 30 and the elongate conductors 26. Also, the conductors 34 are in contact with contact surfaces of the elongate conductors 26 when the movable window assembly 18 is in its open and closed positions, and are in contact with the elongate conductors 26 along at least a portion of the elongate conductors 26 when the movable window assembly 18 travels along its elongate path of travel.

Referring to FIGS. 7 and 8, in one implementation electrical couplings or conductors 35, 37 may include wires 35a, 37a connected at first ends to their respective conductors 34 and connected at second ends to respective buses 30a, 30b of the grid 30 via wire brackets 35b, 37b. The first ends of the wires 35a, 37a may be welded, brazed, adhered, fastened, clipped, or coupled in any other suitable manner to the conductors 34, for example at the intermediate portions thereof, and with or without brackets. The second ends of the wires 35a, 37a may be welded, brazed, adhered, fastened, clipped, or coupled in any other suitable manner to the respective brackets 35b, 37b and/or buses 30a, 30b. The wires 35a, 37a may extend through the apertures 44 of the intermediate portions 42 of the followers 32, and may extend through corresponding conductor passages of the structural support 46 adjacent to the posts 33 of the followers 32.

FIGS. 12 through 16 illustrate a portion of the elongate guide 24 and one of the followers 32, and show movement of the follower 32 out of the straight portion 24e of the elongate guide 24 and to the end of the oblique portion 24c of the elongate guide 24.

Figure 12:
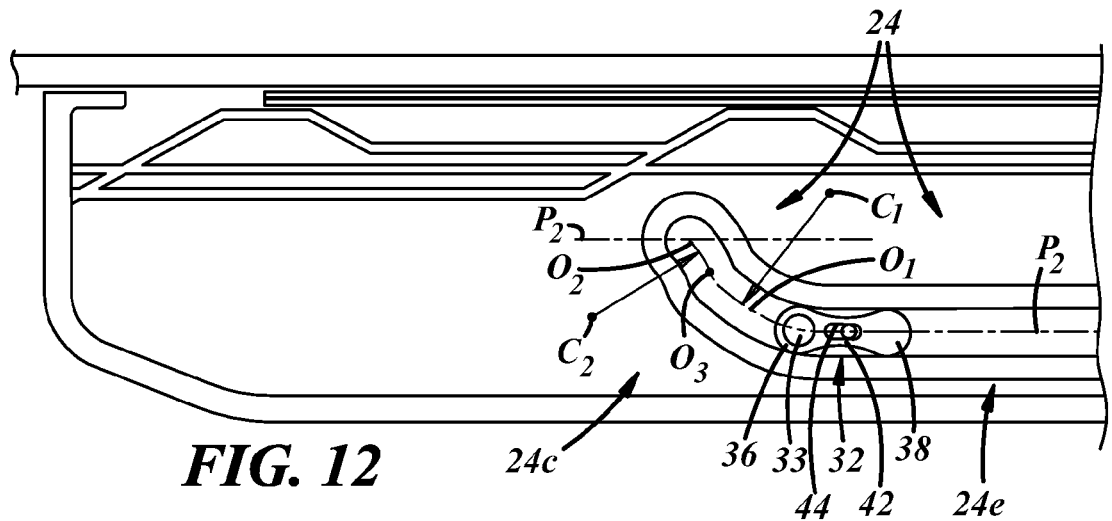
FIG. 12 is an enlarged, fragmentary view of a portion of the elongate guide wherein the follower is moving from a straight portion of the elongate guide to an oblique portion of the elongate guide toward the closed position of the movable window assembly.

FIG. 12, more specifically, illustrates the follower 32 moving from the straight portion 24e of the elongate guide 24 and entering the oblique portion 24c of the elongate guide 24, toward the window assembly closed position. The oblique portion 24c includes an excurvate, or first curvate section O1 having a first radial center C1 on one side of the elongate guide 24, an incurvate, or second curvate section O2 having a second radial center C2 on another side of the elongate guide 24, and an inflection section O3 between the curvate sections O1, O2.

Figure 13:
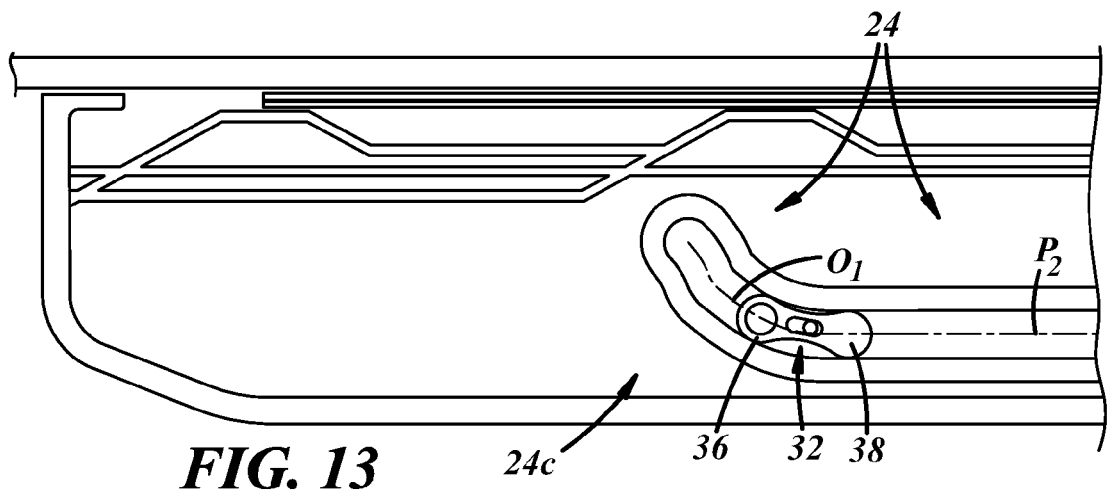
FIG. 13 is an enlarged, fragmentary view of a portion of the elongate guide wherein the follower has moved further toward the closed position from the position shown in FIG. 12.

In FIG. 13, the follower 32 has moved further toward the closed position from the position shown in FIG. 12. Accordingly, the hub 36 of the follower 32 is in the first curvate section O1.

Figure 14:
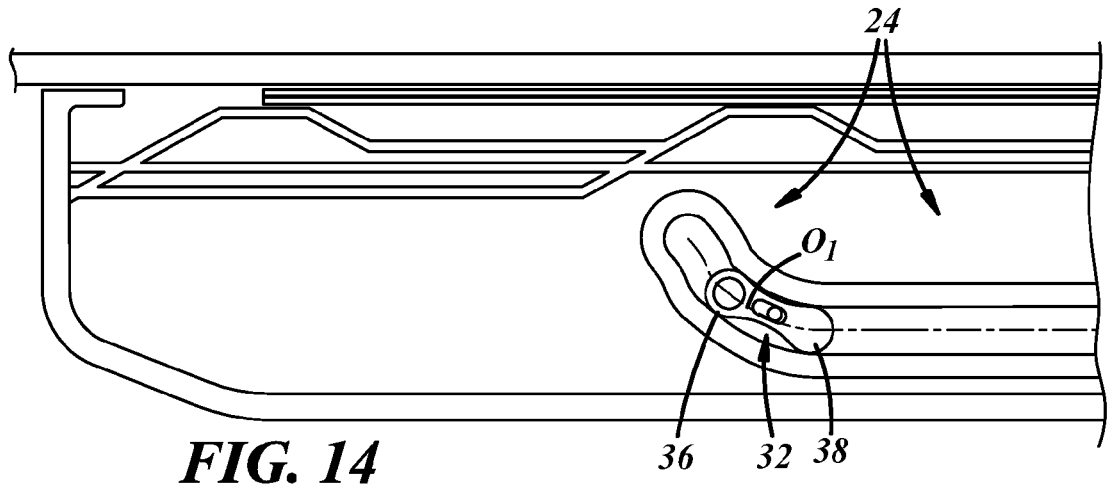
FIG. 14 is an enlarged, fragmentary view of a portion of the elongate guide wherein the follower has moved further toward the closed position from the position shown in FIG. 13 and a hub and a cam of the follower are disposed in a first curvate section of the oblique portion of the elongate guide.

In FIG. 14, the follower 32 has moved further toward the closed position from the position shown in FIG. 13. Accordingly, both the hub 36 and the cam 38 of the follower 32 are disposed in the first curvate section O1.

Figure 15:
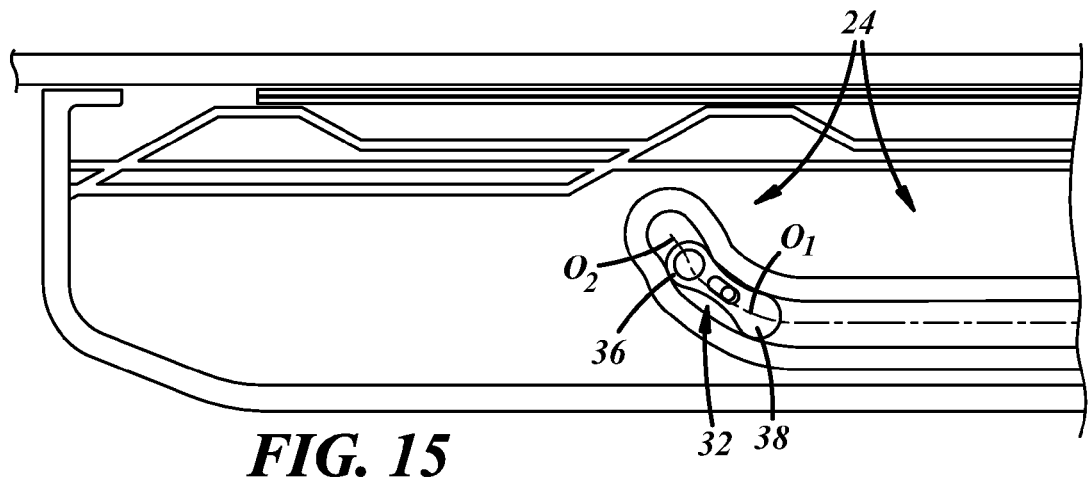
FIG. 15 is an enlarged, fragmentary view of a portion of the elongate guide wherein the follower has moved further toward the closed position from the position shown in FIG. 14 and the hub of the follower is disposed in a second curvate section of the oblique portion of the elongate guide and the cam of the follower is disposed in the first curvate section.

As shown in FIG. 15, the follower 32 has moved further toward the closed position from the position shown in FIG. 14. Accordingly, the hub 36 of the follower 32 is disposed in the second curvate section O2 and the cam 38 is disposed in the first curvate section O1.

Figure 16:
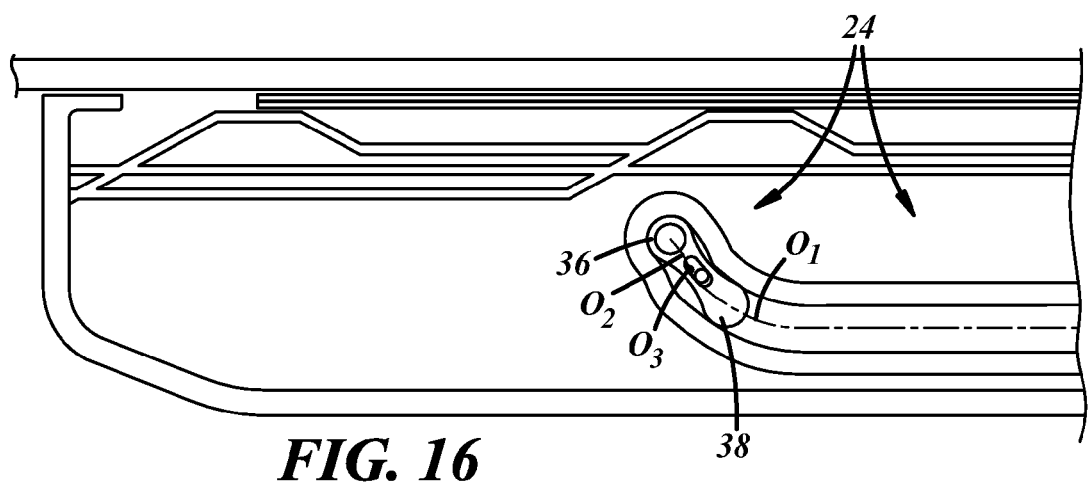
FIG. 16 is an enlarged, fragmentary view of a portion of the elongate guide wherein the follower has moved into the closed position, and the hub of the follower is disposed in the second curvate section and the cam of the follower is disposed in the first curvate section.

As shown in FIG. 16, the follower 32 has moved into the closed position from the position shown in FIG. 15, and the hub 36 of the follower 32 is disposed in the second curvate section O2 and the cam 38 is disposed in the first curvate section O1 on the other side of the inflection section O3 to facilitate holding the movable window assembly in the closed position.

Figure 17:
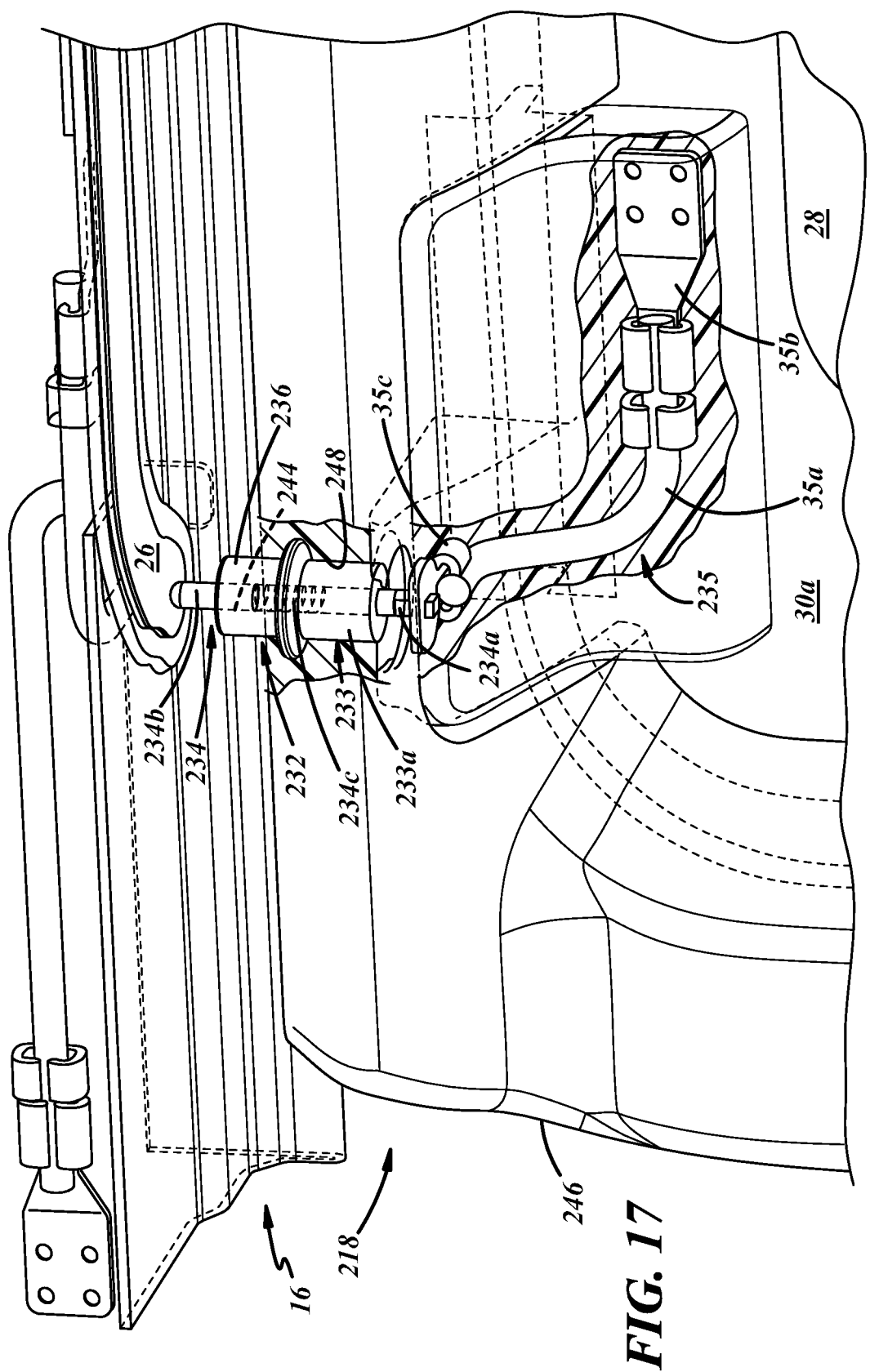
FIG. 17 is an enlarged, fragmentary perspective view of a portion of the window assembly of FIG. 1, illustrating another example implementation of a mounting and conductor arrangement between the guide rail assembly and a movable window assembly.
Figure 18:
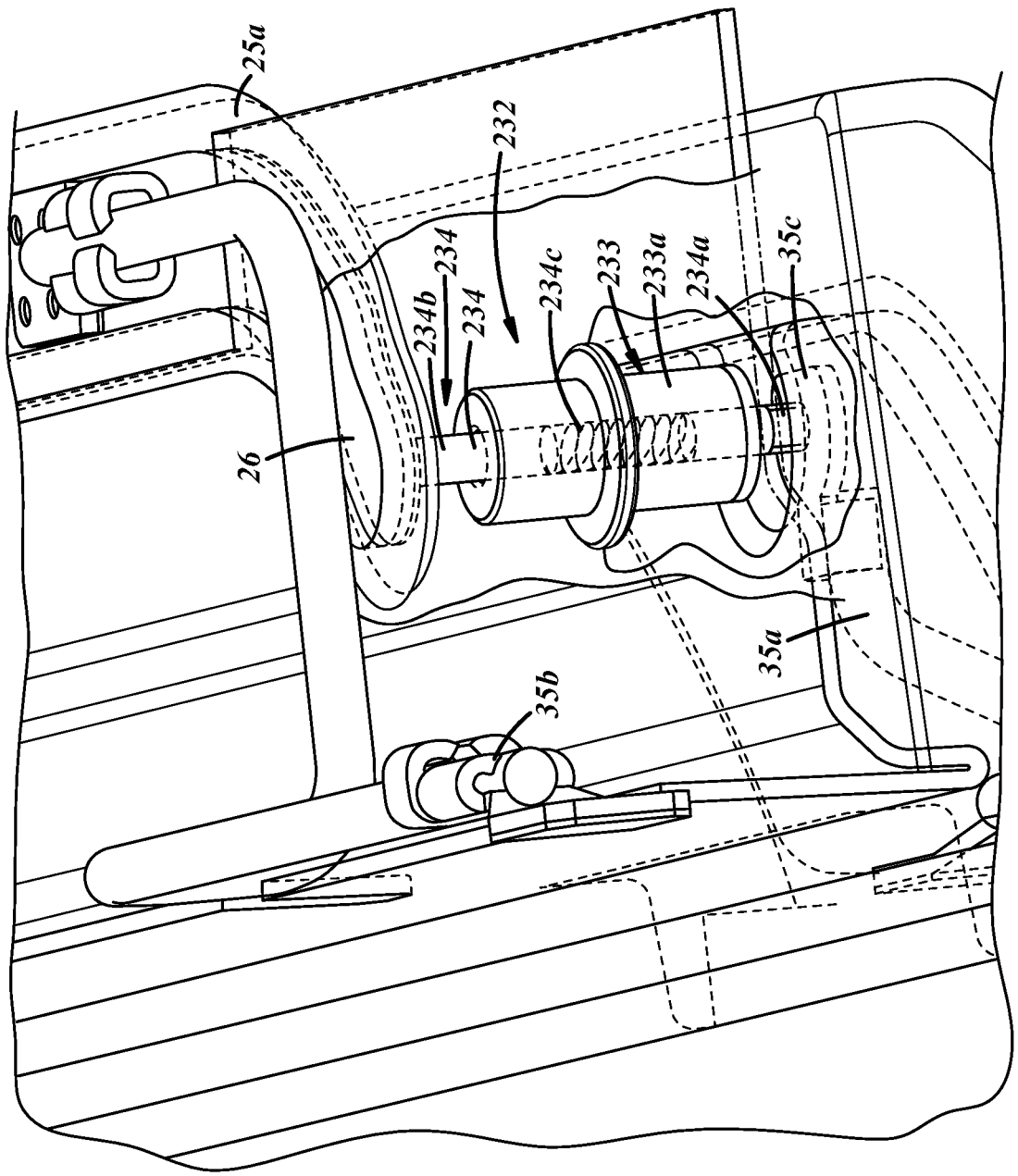
FIG. 18 is an enlarged fragmentary view of the mounting and conductor arrangement of FIG. 17.

FIGS. 17 and 18 illustrate another exemplary implementation of a movable window assembly 218. This implementation is similar in many respects to the implementation of FIGS. 1 through 16 and like numerals between the implementations generally designate like or corresponding elements throughout the several views of the drawing figures. Additionally, the descriptions of the implementations are incorporated by reference into one another and the common subject matter generally may not be repeated here.

The movable window assembly 218 includes one or more followers 232 coupled between the pane 28 and the elongate guides (not shown) of the guide rail assembly 16 to facilitate movement of the movable window assembly 218 along its elongate path of travel. The followers 232 may be carried by a structural support 246. For example, the followers 232 may include posts 233 that may have fixed ends 233a that may be coupled to the structural support 246 by press fit, fastening, adhering, welding, or in any other suitable manner. The followers 232 may be carried in and may be concentric with conductor passages 248 of the structural support 246. The posts 233 of the followers 232 may include free ends (not shown) about which follower hubs 236 may be coupled in any suitable rotatable manner. The posts 233 may include conductor apertures 244 therethrough.

The movable window assembly 218 also may include one or more conductors 234 that are in contact with the elongate conductors 26 when the movable window assembly 218 is in its open and closed positions, and are in contact with the elongate conductors 26 along at least a portion of the elongate conductors 26 when the movable window assembly 218 travels along its elongate path of travel. For example, the conductors 234 may be carried by the followers 232 and may be concentric therewith.

In one implementation, the conductors 234 may include fixed portions 234a that may be carried in the posts 233 of the followers 232, and also may include movable portions or wipers 234b carried in the conductor apertures 244 and extending therefrom and having free ends in contact with the elongate conductors 26. The conductors 234 further may include springs 234c between the fixed and movable portions 234a, 234b to bias the movable portions 234b into contact with the elongate conductors 26. The movable portions 234b may be cylindrical as exemplified in the figures, or spherical, or of any other suitable shape and may include balls, pins, or any other suitable type of components.

The conductors 234 are in electrical communication between the second defrost grid 30 and the elongate conductors 26. In one implementation, electrical couplings or conductors 235 may include wires 35a connected at first ends to their respective conductors 234 and connected at second ends to respective buses 30a of the grid 30 via wire brackets 35b. The first ends of the wires 35a may be coupled directly to the conductors 234 or, as in the illustrated implementation, may be coupled via additional components. For example, the wires 35a may be coupled to a bracket 35c, which may be supported by the structural support 246 and may be coupled to the fixed portions 234a of the conductors 234 that, in turn, may be in electrical communication with the movable wipers 234b of the conductors 234 via the springs 234c of the conductors 234.

Figure 20:
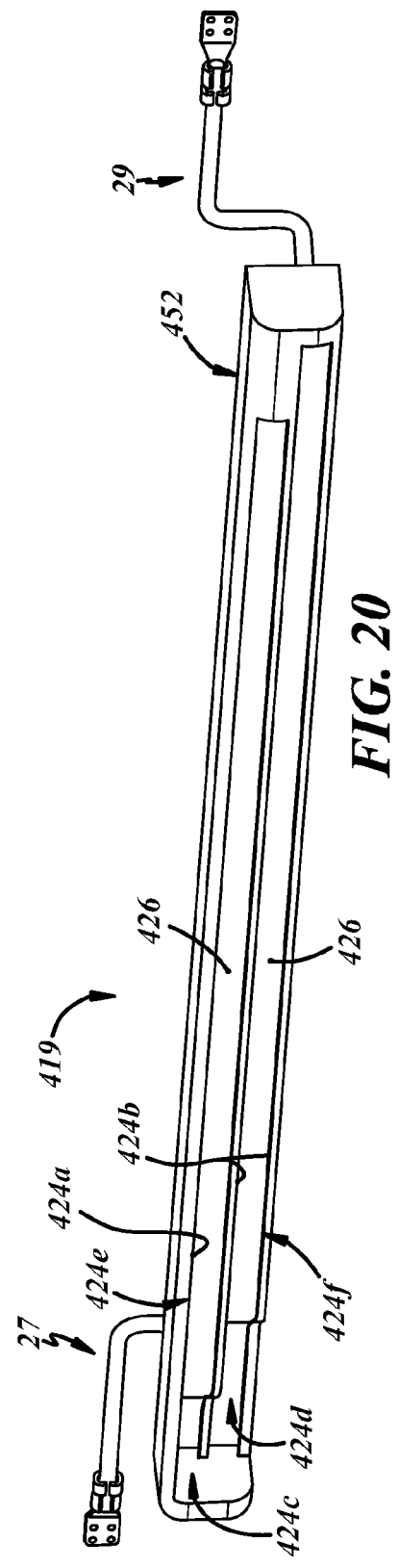
FIG. 20 is a perspective view of an elongate conductor assembly of the guide rail assembly of FIG. 19.
Figure 19:
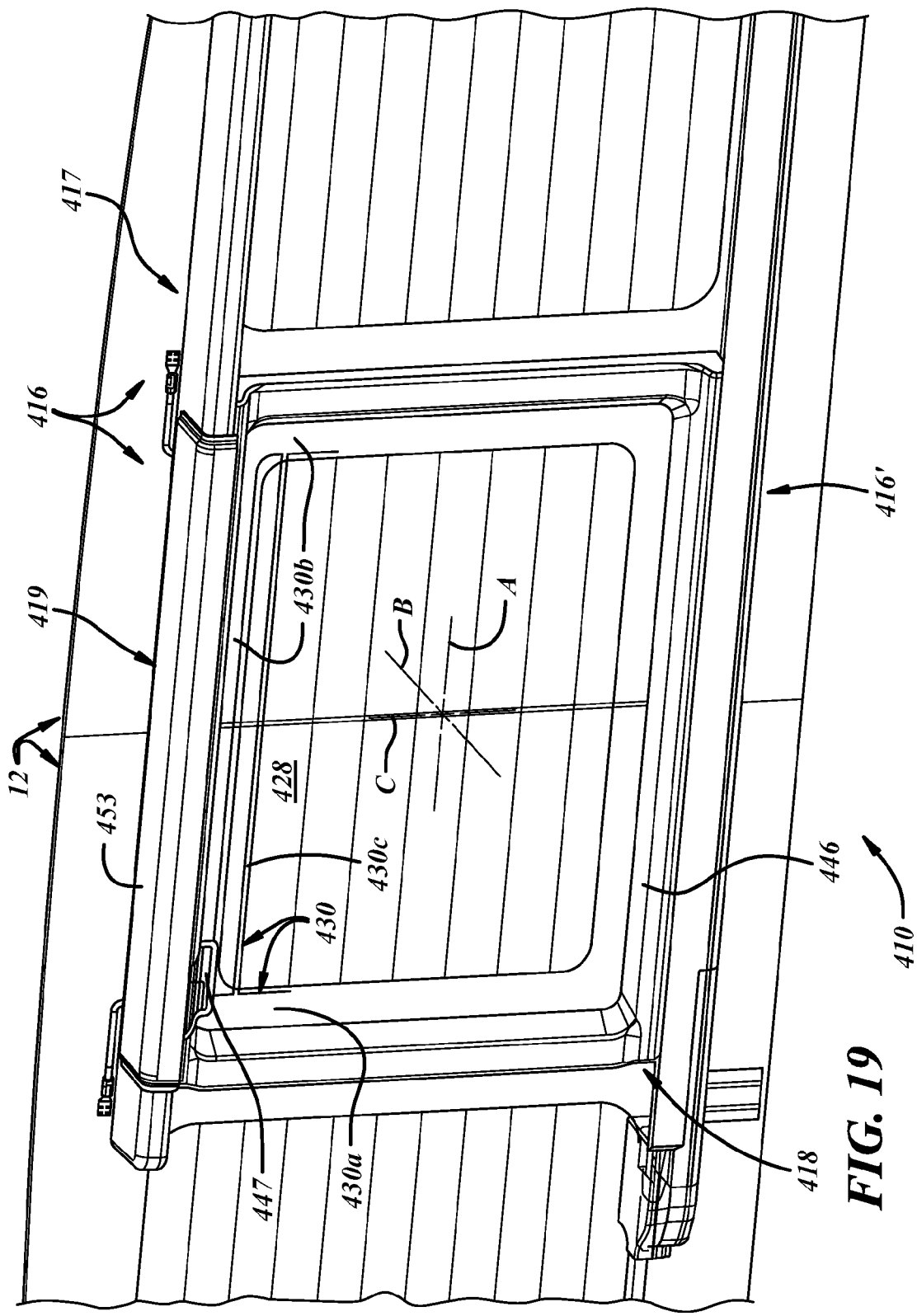
FIG. 19 is an overview of another implementation of a motor vehicle window assembly having a movable window assembly in a closed position and having a guide rail assembly.

FIGS. 19 and 20 illustrate another exemplary implementation of a motor vehicle window assembly 410 including another exemplary implementation of a movable window assembly 418. These implementations are similar in many respects to the implementations of FIGS. 1 through 18 and like numerals between the implementations generally designate like or corresponding elements throughout the several views of the drawing figures. Additionally, the descriptions of the implementations are incorporated by reference into one another and the common subject matter generally may not be repeated here.

The window assembly 410 includes the fixed pane 12, a guide rail assembly 416, and a movable window assembly 418 carried by the guide rail assembly 416 along an elongate path of travel between closed and open positions. The window assembly 410 also may include another, lower guide rail assembly 416' that also may be used to carry and/or guide the movable window assembly 418. The guide rail assembly 416 may include a guide rail 417 of any suitable type and construction, and an elongate conductor assembly 419 carried by the guide rail 417.

Referring to FIG. 20, the elongate conductor assembly 419 may include an elongate base 452 that may be coupled to the guide rail 417 (FIG. 19), elongate conductors 426 that may be carried by the elongate base 452, and the electrical couplings or conductors 27, 29 to couple the elongate conductors 426 to respective defrost grid buses (not shown).

The elongate base 452 may be unitary or may be constructed of several separate components, and may be composed of plastic or any other suitable material. The elongate base 452 may include elongate conductor guides 424a, 424b. The guides 424a, 424b may include oblique portions 424c, 424d and straight portions 424e, 424f extending from or in communication with the oblique portions 424c, 424d. The oblique portions 424c, 424d may be obliquely disposed with respect to the straight portions 424e, 424f and may be angled and/or curved.

The elongate conductors 426 are carried by the elongate conductor guides 424a, 424b of the base 452 and may include portions corresponding to the paths 424c, 424d, 424e, 424f of the guides 424a, 424b. The conductors 426 may be identical, and may be spaced apart in a direction generally parallel to the transverse axis C and may substantially overlap one another in a direction generally parallel to the sliding axis A. The conductors 426 may include strips or bands of conductive metal, or any other suitable conductive material of any suitable shape. The conductors 426 may be adhered, fastened, integrally interengaged, or coupled in any other suitable manner to the base 452.

Referring again to FIG. 19, the movable window assembly 418 may include a pane 428 having a second defrost grid 430. The pane 428 may be composed of glass, plastic, or any other suitable material. The second defrost grid 430 may include a first bus 430a at one side of the pane 28, and a second bus 430b extending from a location adjacent the first bus 430a and extending toward and occupying at least a portion of another side of the pane 428, and one or more heater elements 430c extending between the buses 430a, 430b.

Figure 21:
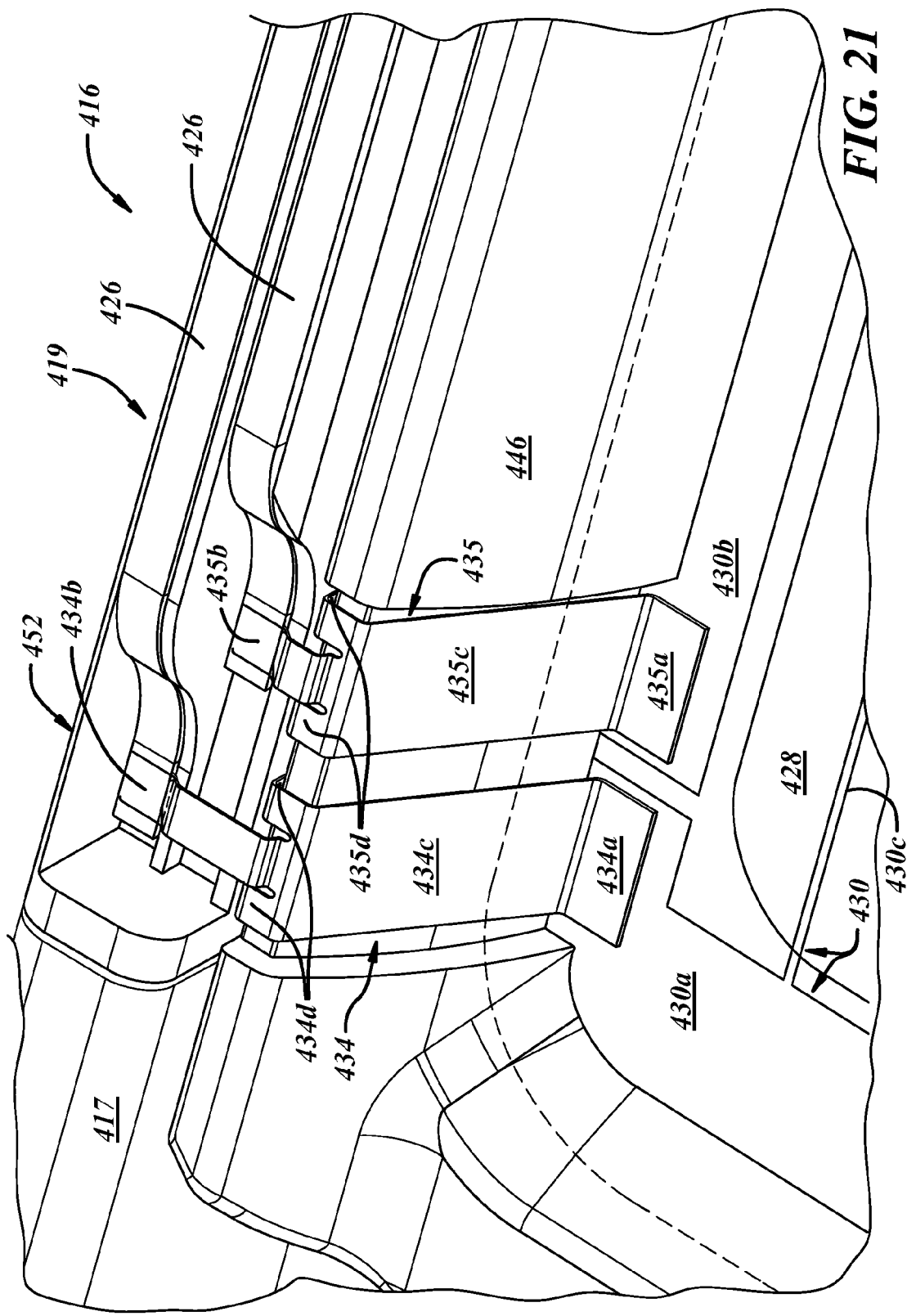
FIG. 21 is an enlarged, fragmentary perspective view of a portion of the window assembly of FIG. 19, illustrating a portion of an example implementation of a guide rail assembly including first and second elongate conductors for cooperation with conductors of a movable window.

Referring to FIG. 21, the movable window assembly 418 also may include a structural support 446. The structural support 446 may be a frame that may completely surround the pane 428 as exemplified in the drawing figures, or may be a frame portion that may bound one or more portions of the pane 428, or may be a support of any other suitable type.

The movable window assembly 418 also includes conductors 434, 435. The conductors 434, 435 may be carried by the structural support 446 in any suitable manner. For example, in one implementation, the conductors 434, 435 may include cantilevered wipers having fixed ends 434a, 435a, free ends 434b, 435b, and intermediate portions 434c, 435c. The fixed ends 434a, 435a may be adhered, brazed, or coupled in any other suitable manner to their respective buses 430a, 430b. The intermediate portions 434c, 435c may extend over corresponding portions of the structural support 446 and may be clipped to edges of the structural support 446 with integral clips 434d, 435d, and/or may be adhered, fastened, and/or coupled in any other suitable manner to the structural support 446. The free ends 434b, 435b may be biased into contact with their respective elongate conductors 426. For example, the free ends 434b, 435b may be cantilevered from the intermediate portions 434c, 435c and toward the conductors 426, and may be curved or dished for good surface contact with and smooth traversing of the conductors 426.

In addition to the conductor paths 424c, 424d, 424e, 424f, the movable window assembly 418 may be guided between its closed and open positions by the guides of the previously described implementations and any suitable corresponding devices of the movable window assembly of the previously described implementations. Such corresponding devices may include the followers of the previously described implementations, or posts, pins, or any other suitable devices.

The conductors 426 may have a shape that corresponds to the shape of the guides 24 to allow the wipers 434, 435 to maintain contact with the conductors 426 over the elongate path of travel of the movable window assembly 418. However, the conductors 426 may be spaced apart from the elongate guides 24 in a direction extending away from the fixed pane 12.

Also, the conductors 426 may be oriented generally orthogonally with respect to the elongate guides 24. Accordingly, the conductors 426 are oriented differently with respect to the guides 24 than the conductors 26 of FIG. 9. For example, with reference to FIG. 9, the conductors 26 may be oriented generally parallel with respect to the guides 24. More specifically, the contact surfaces of the conductors 26 are disposed in a plane that is parallel to the direction of the width of the guides 24 along the second axis B. In contrast, as exemplified in FIG. 21, the conductors 426 may be oriented such that the contact surfaces thereof are disposed in a plane generally parallel to the first and third axes A, C and, thus, perpendicular to the second axis B.

Figure 22:
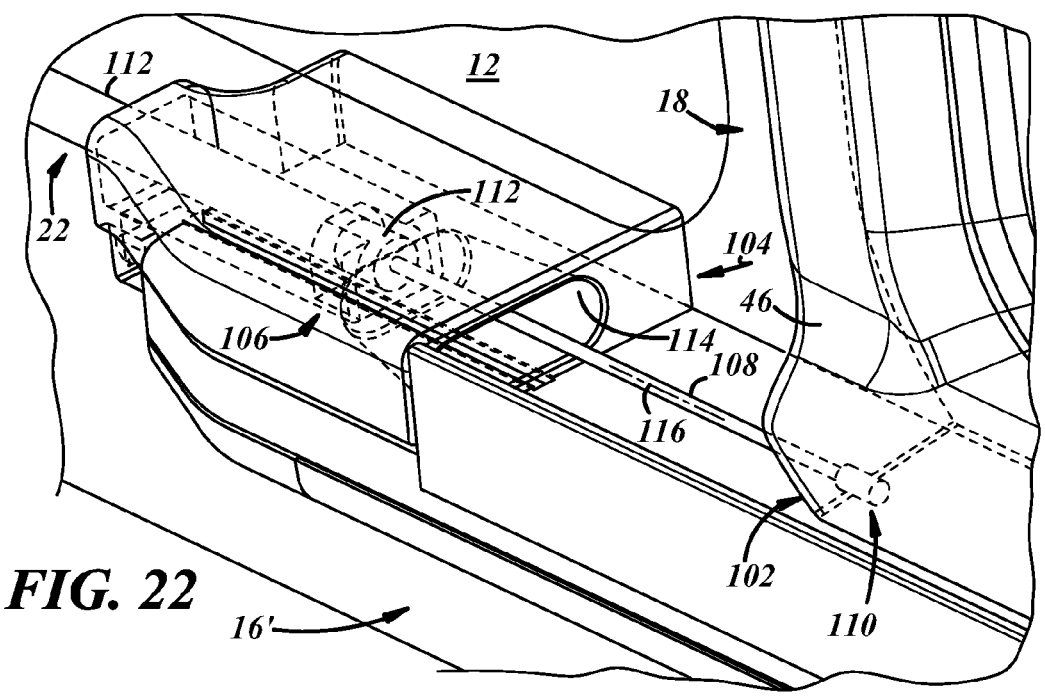
FIG. 22 is an enlarged perspective view of a portion of the motor vehicle window assembly of FIG. 1, illustrating a lower guide rail assembly and a portion of the movable window assembly in a plane parallel to an end portion of an actuator cable just before the movable window assembly moves out of the plane toward a closed position.

Referring now to FIG. 22, the motor vehicle window assembly 10 includes a lower guide rail assembly 16' that may support the movable window assembly 18 instead of or in addition to the upper guide rail assembly 16. The movable window assembly 18 includes the structural support 46, which may include a cable connector portion 102, for example, at a lower corner region thereof. Accordingly, the cable connector portion 102 may be coupled to the pane 28 via the structural support 46 or in any other suitable manner.

The motor vehicle window assembly 10 also may include a cable mount 104 extending in a direction away from a surface of the fixed pane 12 and including a retainer portion 106 to retain the cable 22. The retainer portion 106 may include one or more features integral to the rest of the mount 104 or one or more separate retainer components or both. As will be described in further detail below, the cable mount 104 may facilitate the non-linear movement of the movable window assembly 18, wherein a cable pull vector is not linear but planar over complete travel of the assembly 18.

Figure 24:
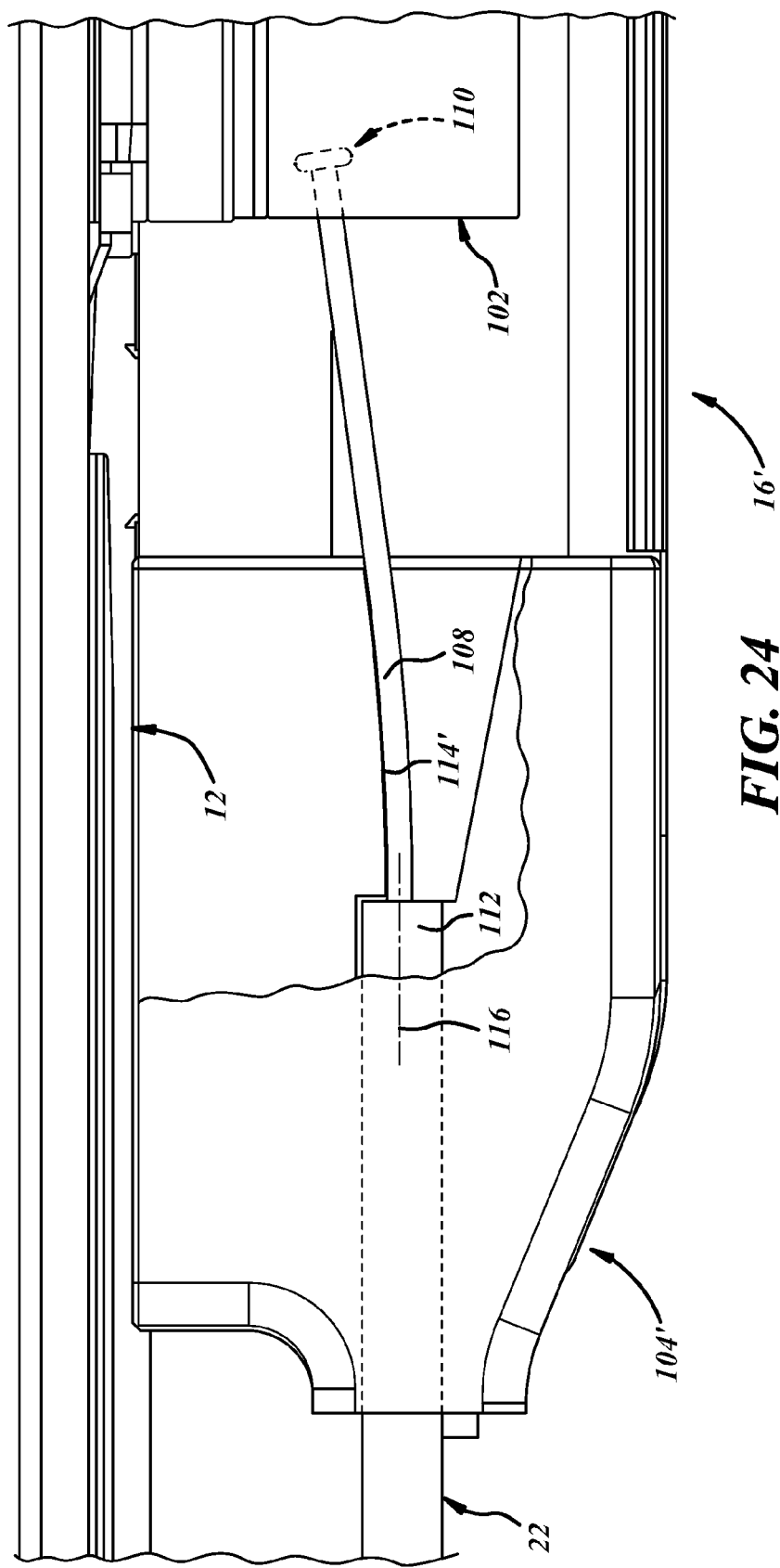
FIG. 24 is an enlarged perspective view of the portion of the window assembly of FIG. 22, illustrating the movable window assembly moved into another plane in the closed position.

The cable 22 includes a core 108 having a terminus 110 coupled to the cable connector portion 102 of the window assembly structural support 46, and a sheath 112 covering at least a portion of the core 108 and being retained to the cable mount 104 by the retainer portion 106. The terminus 110 may be of any suitable size and shape and may be considered to be that portion of the cable 22 that is coupled to the window assembly 18. For example, as shown in FIG. 22, the terminus 110 may be generally of cylindrical shape having a diameter about twice that of the core 108 and having a longitudinal axis generally parallel with that of the core 108. In another example, as shown in FIG. 24, a terminus 110' may be of generally cylindrical shape having a diameter similar to that of the core 108, but having a longitudinal axis generally perpendicular to that of the core 108. The terminus 110 may include an enlargement of the core 108 itself, or may include a separate component coupled to the core 108 in any suitable manner. When the actuator cable 22 is actuated, the movable window assembly 18 moves in a direction extending away from the open position along the second plane P2 (FIG. 11), toward the closed position out of the second plane P2, and into the closed position in the first plane P1 (FIG. 11) such that the terminus 110 of the core 108 is carried out of the second plane P2 by the movable window assembly.

The cable mount 104 includes a cable support surface 114 disposed between the fixed pane 12 and a longitudinal axis 116 of the cable 22. As shown in FIGS. 22 and 23, the cable support surface 114 may be straight and disposed at a non-zero angle with respect to the longitudinal axis 116 of the cable 22 in a direction toward the fixed pane 12. As shown in FIG. 24, a cable support surface 114' of a cable mount 104' may be arcuate or otherwise non-linear. The non-linear shape of the surface 114' may facilitate good support of the cable 22 to resist wear and promote good operation of the movable window assembly 18. This configuration may help avoid concentrated contact of the cable core with the cable sheath.

In any case, the cable mount 104 may be coupled to the lower guide rail assembly 16' in any suitable manner by any suitable configuration. For example, the mount 104 may be releasably snap fit to a portion of the lower guide rail assembly 16' and/or may be coupled thereto with a tongue and groove connection therebetween. The mount 104 also or instead may be coupled to the assembly 16' via fasteners, adhesive, or in any other suitable manner.

With reference to FIG. 25, the portion of the guide rail assembly 16' to which the mount 104 (FIG. 22) is coupled may include a mounting surface 118 to support the mount 104 thereon, an end surface 120 extending from the base surface 118, and a latch feature 122 that may extend longitudinally from the end surface 120. The latch feature 122 may be a cantilevered bayonet as shown, or any other suitable type of latch feature. Also, the mounting surface 118 may include a slidable engagement feature 130, which may include an elongate generally T-shaped feature for example a groove as shown.

Figure 26:
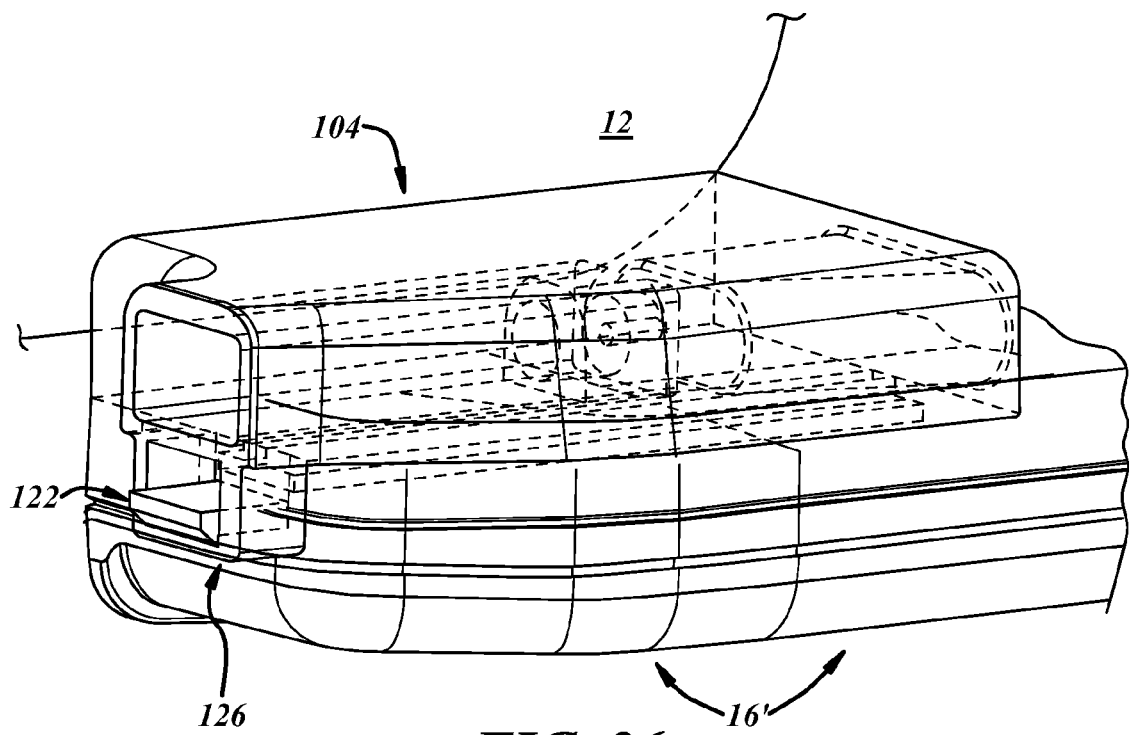
FIG. 26 is a perspective view of the portion of the guide rail assembly of FIG. 25 with the cable mount of FIG. 25 coupled thereto.

With reference to FIG. 25, the cable mount 104 includes a base surface 124 for contact with the mounting surface 118 and a latch feature 126 that may project from the base surface 124 for cooperation with the latch feature 122 of the guide rail assembly 16'. The latch feature 126 may include a portion to be trapped between a barb 128 of the latch feature 122 and the end surface 120 when the mount 104 is coupled to the lower guide rail assembly 16'. Also, the cable mount 104 may include a slidable engagement feature 132 that cooperates with the engagement feature 130 of the guide rail assembly 16'. The feature 132 may include an elongate generally T-shaped feature for example a tongue as shown. For example, the mount 104 may be joined to the guide rail assembly 16' with a tongue and groove slidable connection, wherein the cable mount 104 is slidably mounted to a corresponding portion of the guide rail assembly 16 by interengagement of the T-shaped features 130, 132. Those of ordinary skill in the art will recognize that the tongue and the groove are interchangeable and may be provided on one or the other of the corresponding portions of the mount 104 and assembly 16'. FIG. 26 is a perspective view of the portion of the guide rail assembly of FIG. 25 with the cable mount of FIG. 25 coupled thereto.

Referring now to FIGS. 27 and 28, the cable connector portion 102 of the movable window assembly 18 may include features integral to the structural support 46. In another implementation, the connector portion 102 may include a separate component that may be pivotably coupled to the structural support 46, for example a plate with a pivot pin on one portion for pivotable coupling to the support 46 and with a hook on another portion for coupling to the terminus of the cable core. In yet another implementation, the connector portion 102 may include features integral with a follower and bracket assembly 32'.

In the illustrated implementation, the cable connector portion 102 may include a base surface 134, an end surface 136 extending from the base surface 134, and a relief 138 in the base and end surfaces 134, 136. The base surface 134 may include a bottom surface of the support 46, and the end surface 136 may include a side surface of the support 46. The relief 138 accepts the core terminus 110 (FIG. 22) and an adjacent portion of the core 108 (FIG. 22) and accommodates relative movement of the terminus 110 and the adjacent portion of the core 108 as the movable window assembly 18 moves toward the closed position from the second plane P2 to the first plane P1 (FIG. 11). Also, the relief 138 may include a base aperture 140 in the base surface 134 spaced from the end surface 136, and an end aperture 142 (FIG. 28) in the end surface 136 spaced from the base surface 134. The base aperture 140 may be generally circular or cylindrical in shape, and the end aperture 142 may be generally rectangular in shape. The relief 138 also may include an elongate slot 144 in the base surface 134 having one end in communication with the base aperture 140 and another end in communication with the end aperture 142. The slot 144 may be generally T-shaped. The core terminus 110 may be retained in the base aperture 140 and the adjacent portion of the core 108 may extend through the slot 144 and out of the end aperture 142. The core terminus 110 and the various features of the cable connector portion 102 may be sized and shaped so as to permit easy assembly of the terminus 110 and core 108 to the support 46, to retain the terminus 110 in the cable connector portion 102, and allow movement of the core 108 relative to the support 46.

In general, the components of the window assemblies described herein can be manufactured according to techniques known to those skilled in the art, including molding, machining, stamping, and the like. Also, the window assemblies can be assembled according to known techniques. Likewise, any suitable materials can be used in making the components, for example metals, composites, polymeric materials, and the like.

While the forms of the invention herein disclosed constitute presently preferred implementations, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A motor vehicle window assembly, comprising:
a fixed pane having a first defrost grid;
a guide rail assembly including an elongate guide having a straight guide portion and an oblique guide portion that is oblique relative to the straight guide portion and having an elongate conductor in electrical communication with the first defrost grid; and
the guide rail assembly adapted to guide a movable window assembly along an elongate path of travel between a closed position and an open position, the movable window assembly including:
a pane movable relative to the fixed pane along the elongate path of travel between the closed position of the movable window assembly in a first plane and the open position of the movable window assembly in a second plane offset from the first plane and the movable pane having a second defrost grid,
a wiper in electrical communication with both the second defrost grid and the elongate conductor of the guide rail assembly, a follower coupled to the movable pane for movement with the movable pane, wherein the follower engages the elongate guide to guide the movable pane along the elongate path of travel to define the closed position of the movable window assembly in the first plane and the open position of the movable window assembly in the second plane, and wherein the wiper is disposed within the elongate guide mounted on the follower, disposed between the follower and the elongate conductor, and biased into contact with the elongate conductor to maintain the electrical communication between the second defrost grid and the elongate conductor throughout movement of the movable pane along the elongate path of travel.

2. The motor vehicle window assembly of claim 1, wherein the guide rail assembly comprises an upper guide rail assembly, the wiper comprises a first wiper, and the elongate conductor comprises a first elongate conductor, the motor vehicle window assembly further comprises:
a lower guide rail assembly,
wherein the fixed pane has a third defrost grid, and the upper guide rail assembly includes a second elongate conductor in electrical communication with the third defrost grid, and
wherein the movable window assembly is guided by the guide rail assemblies and includes:
a second follower coupled to the movable pane so that the followers move with the movable pane, wherein the elongate guide and the followers cooperate to guide the movable pane along the elongate path of travel, and
a second wiper disposed on said second follower and being in electrical communication with the second defrost grid and the second elongate conductor, and the second wiper being in contact with the second elongate conductor when the movable window assembly is in the open and being closed positions and in contact with the second elongate conductor along at least a portion of the second elongate conductor when the movable window assembly travels along the elongate path of travel,
wherein the first wiper wipes across the first elongate conductor and the second wiper wipes across the second elongate conductor when the movable window assembly travels along the elongate path of travel, and
wherein continuous electrical communication is provided between the first and third defrost grids through the second defrost grid when the movable window assembly is in the open position, the closed position or positioned there between.

3. The motor vehicle window assembly of claim 1 wherein the wiper is a cantilevered wiper disposed between the follower and the elongate conductor and is biased into contact with the elongate conductor.

4. The motor vehicle window assembly of claim 3 wherein the follower includes a hub to which an end of the cantilevered wiper is fixed and includes a cam spaced from the hub the cantilevered wiper terminates at a free end which is in contact with the elongate conductor, and the movable window assembly further comprises a window assembly conductor extending between the cantilevered wiper and the second defrost grid, and wherein the follower includes an intermediate portion connecting the hub and the cam, and the intermediate portion includes an aperture through which the window assembly conductor extends.

5. The motor vehicle window assembly of claim 1 wherein the elongate guide includes a track, and the elongate conductor follows the elongate path of travel.

6. The motor vehicle window assembly of claim 1 wherein the elongate path of travel includes a component along a first axis and a component along a second axis transverse to the first axis as the movable pane moves in and between the first and second planes, and the elongate conductor is spaced apart from the movable pane in a direction extending away from the fixed pane along a third axis that is transverse to the first axis and the second axis and is oriented generally orthogonally with respect to the elongate conductor.

7. The motor vehicle window assembly of claim 6 wherein the movable window assembly includes a structural support that bounds at least a portion of the movable pane, and wherein the wiper is a cantilevered wiper that includes a fixed end in electrical communication with the second defrost grid and a free end biased into contact with the elongate conductor.

8. The motor vehicle window assembly of claim 7 wherein the elongate guide includes a curved portion, and the elongate conductor has a curved portion that corresponds to the curved portion of the elongate guide to allow the wiper of the movable window assembly to maintain electrical communication with the elongate conductor as the movable window assembly moves along the elongate path of travel.

9. The motor vehicle window assembly of claim 1, wherein the wiper is cantilevered to the follower.

10. The motor vehicle window assembly of claim 1, wherein the follower includes an aperture to receive a wire extending through the aperture.

11. The motor vehicle window assembly of claim 1, which includes a cam that contacts the elongate guide for moving the wiper with respect to the movable pane.

12. The motor vehicle window assembly of claim 1, wherein the follower includes a fixed end coupled to the movable pane and a free end, and the wiper is disposed on the free end of the follower.

13. The motor vehicle window assembly of claim 12, wherein at least one of the follower and the wiper rotate relative to the movable pane as the movable pane moves along the elongate path of travel.

14. A motor vehicle window assembly, comprising:
a fixed pane having a first defrost grid, a fixed conductor in electrical communication with the first defrost grid, and a guide rail, wherein the conductor has a straight portion and an oblique portion that is oblique relative to the straight portion and the guide rail has a straight portion and an oblique portion that is oblique relative to the straight portion of the guide rail;
a movable pane guided by the guide rail for movement between a closed position in a first plane and a fully open position in a second plane offset from the first plane, and a second defrost grid carried by the movable pane, wherein the oblique portion of the guide rail causes movement of the movable pane between the first plane and second plane as the movable pane moves between the fully open position and the closed position; and
a movable conductor in electrical communication with the second defrost grid and the fixed conductor and movable with the movable pane and relative to the fixed conductor when the movable pane is moved between the fully open position and the closed position, and the movable conductor includes a contact portion which is in, sliding contact with the fixed conductor during movement of the movable pane between the sliding contact fully open position and the closed position, and the movable conductor extends outwardly from the movable pane in a direction parallel to the first plane and the contact portion is positioned beyond a perimeter of the movable pane.

15. The motor vehicle window assembly of claim 14, that also includes a follower coupled between the movable pane and the guide rail, wherein the guide rail and the follower cooperate to guide the movable pane between the closed position and the fully open position and wherein the movable conductor is carried by the follower.

16. A motor vehicle window assembly, comprising:
a fixed pane having a first defrost grid;
an upper guide rail;
a lower guide rail;
a movable pane disposed between the upper guide rail and the lower guide rail for movement between a closed position in a first plane and an fully open position in a second plane offset from and generally parallel to the first plane, the movable pane having a second defrost grid;
a first conductor in electrical communication with the first defrost grid and having a contact surface disposed in a plane that intersects the first plane and the second plane; and
a movable conductor in electrical communication with the second defrost grid and the first conductor, the movable conductor being movable with the movable pane and relative to the first conductor when the movable pane is moved between the fully open position and the closed position, the movable conductor having a contact portion which is in sliding contact with the contact surface of the first conductor and is entirely disposed outside a perimeter of the movable pane, and said contact between the movable conductor and said contact surface occurs when the movable pane is not moving and during the movement of the movable pane between the fully open position and the closed position to maintain electrical power to the second defrost grid throughout the movement of the movable pane between the fully open position and the closed position.

17. The assembly of claim 16 wherein the first conductor has a straight conductor portion and an oblique conductor portion that is oblique relative to the straight conductor portion.

18. The assembly of claim 16 wherein the upper guide rail and the lower guide rail constrain movement of the movable pane in a direction along an axis parallel to the first plane and perpendicular to the contact surface, and the contact portion of the movable conductor is spaced from the movable pane along the axis.

19. The assembly of claim 16 wherein the upper guide rail and the lower guide rail constrain movement of the movable pane in a direction along an axis parallel to the first plane and perpendicular to the contact surface and the contact portion is biased into engagement with the first conductor along the axis.

* * * * *